(12) United States Patent
Helweg

(10) Patent No.: US 8,612,334 B2
(45) Date of Patent: *Dec. 17, 2013

(54) SYSTEMS AND METHODS FOR PRICE EVALUATION OF ARTICLES OF COMMERCE

(75) Inventor: Mark W. Helweg, Austin, TX (US)

(73) Assignee: Microquant, LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,376

(22) Filed: May 31, 2012

(65) Prior Publication Data

US 2013/0030976 A1 Jan. 31, 2013

Related U.S. Application Data

(63) Continuation-in-part of application No. 12/272,942, filed on Nov. 18, 2008, now Pat. No. 8,195,553, which is a continuation of application No. 09/536,328, filed on Mar. 24, 2000, now Pat. No. 7,461,023.

(60) Provisional application No. 61/491,621, filed on May 31, 2011.

(51) Int. Cl.
G06Q 40/00 (2012.01)

(52) U.S. Cl.
USPC .............................. 705/37; 705/35; 705/36 R

(58) Field of Classification Search
USPC ........................................... 705/35, 36 R, 37
See application file for complete search history.

(56) References Cited

U.S. PATENT DOCUMENTS

| | | | |
|---|---|---|---|
| 5,454,104 A | 9/1995 | Steidlmayer et al. | |
| 5,999,918 A | 12/1999 | Williams | |
| 6,012,042 A | 1/2000 | Black et al. | |
| 6,014,643 A | 1/2000 | Minton | |
| 6,061,662 A | 5/2000 | Makivic | |
| 6,078,904 A | 6/2000 | Rebane | |
| 6,321,212 B1 | 11/2001 | Lange | |
| 6,839,686 B1 | 1/2005 | Galant | |
| 7,047,218 B1 | 5/2006 | Wallman | |
| 7,461,023 B1 | 12/2008 | Helweg | |
| 8,195,553 B2 | 6/2012 | Helweg | |
| 2003/0093347 A1 | 5/2003 | Gray | |
| 2005/0160021 A1 | 7/2005 | Nesmith et al. | |

OTHER PUBLICATIONS

"Reuters and John Bollinger's Acme Analytics Corp.Announce Content Agreement; Bollinger Stock Performance Charts to be Offered on Reuters Investor". PR Newswire, New York: Sep. 28, 1999. p. 1.
"Introducing IQ Chart, Professional-Quality Stock Analysis Software for the Internet Investor Business Editors" Business Wire. New York: Aug. 4, 1998. p. 1.
Santoli, Michael. "The striking price: About that chart below". Barron's. New York, N. Y.: Feb. 7, 2000. vol. 80, Iss. 6; p. MW10 (1 page).
Computer printout of http://www.bollingerbands.com/bbands.asp. Title, Bollinger Bands Tutorial #1.
J. Peter Steidlmayer, "Steidlmayer on Markets a New Approach to Trading". John Wiley & Sons, Inc., (May 24, 1989).

Primary Examiner — Lalita M Hamilton
(74) Attorney, Agent, or Firm — Hahn Loeser+Parks LLP; Scott M. Oldham, Esq.

(57) ABSTRACT

The invention is directed to systems and methods for indicating volatility adjusted price information for at least one article of commerce or market therefore, and various tools for providing valuation indicators for both current and historical price activity in terms of valuation rather than absolute price. The invention provides users indicators which quantify the degree in which a market is currently trading at fair value, overvalued or undervalued conditions using enhanced tools.

20 Claims, 16 Drawing Sheets

| | 1 | 2 | 3 | 4 | 5 | 6 | 7 | 8 | 9 | 10 |
|---|---|---|---|---|---|---|---|---|---|---|
| | Date | Open | High | Low | Close | Floating Axis | Relative Open | Relative High | Relative Low | Relative Close |
| | 990831 | 45.437 | 46.500 | 44.250 | 45.000 | 47.894 | -1.457 | -1.394 | -3.644 | -2.894 |
| | 990901 | 45.500 | 47.625 | 45.375 | 47.375 | 47.575 | -2.075 | 0.050 | -2.200 | -0.200 |
| | 990902 | 46.750 | 47.250 | 46.375 | 47.000 | 46.950 | -0.200 | 0.300 | -0.575 | 0.050 |
| | 990903 | 48.000 | 48.750 | 47.812 | 48.125 | 46.800 | 1.200 | 1.950 | 1.012 | 1.325 |
| | 990907 | 48.500 | 48.812 | 47.312 | 47.312 | 47.006 | 1.494 | 1.806 | 0.306 | 0.306 |
| | 990908 | 46.937 | 47.000 | 45.687 | 46.000 | 47.200 | -0.263 | -0.200 | -1.513 | -1.200 |
| | 990909 | 45.562 | 46.750 | 45.500 | 46.500 | 47.125 | -1.563 | -0.375 | -1.625 | -0.625 |
| | 990910 | 47.000 | 47.125 | 45.812 | 45.875 | 47.056 | -0.056 | 0.069 | -1.244 | -1.181 |
| | 990913 | 45.937 | 46.375 | 45.062 | 45.125 | 46.544 | -0.607 | -0.169 | -1.482 | -1.419 |
| | 990914 | 45.125 | 45.250 | 44.312 | 44.500 | 45.887 | -0.762 | -0.637 | -1.575 | -1.387 |
| | 990915 | 44.750 | 45.250 | 43.937 | 44.500 | 45.537 | -0.787 | -0.287 | -1.600 | -1.037 |
| | 990916 | 45.000 | 45.937 | 44.562 | 45.500 | 45.362 | -0.362 | 0.575 | -0.800 | 0.138 |
| | 990917 | 45.437 | 45.750 | 44.937 | 45.625 | 45.137 | 0.300 | 0.613 | -0.200 | 0.488 |
| | 990920 | 46.000 | 46.125 | 45.000 | 45.062 | 45.106 | 0.894 | 1.019 | -0.106 | -0.044 |
| | 990921 | 44.875 | 45.625 | 44.125 | 44.500 | 45.125 | -0.250 | 0.500 | -1.000 | -0.625 |
| | 990922 | 44.562 | 44.812 | 43.750 | 44.000 | 45.062 | -0.500 | -0.250 | -1.312 | -1.062 |
| | 990923 | 44.000 | 44.250 | 42.250 | 42.437 | 44.662 | -0.662 | -0.412 | -2.412 | -2.225 |
| | 990924 | 42.625 | 43.125 | 42.000 | 42.625 | 44.106 | -1.481 | -0.981 | -2.106 | -1.481 |
| | 990927 | 43.125 | 43.875 | 42.750 | 43.625 | 43.656 | -0.531 | 0.219 | -0.906 | -0.031 |
| | 990928 | 43.125 | 44.000 | 41.812 | 43.750 | 43.262 | -0.137 | 0.738 | -1.450 | 0.488 |
| | 990929 | 43.625 | 44.875 | 43.250 | 43.500 | 43.219 | 0.406 | 1.656 | 0.031 | 0.281 |
| | 990930 | 43.625 | 44.125 | 42.937 | 43.500 | 43.275 | 0.350 | 0.850 | -0.338 | 0.225 |

Figure 2

| | 1 | 2 | 3 | 4 | 5 | 6 | 7 | 8 | 9 | 10 | 11 |
|---|---|---|---|---|---|---|---|---|---|---|---|
| | Date | Open | High | Low | Close | Floating Axis | Volatility Unit | Value Open | Value High | Value Low | Value Close |
| | 990831 | 46.437 | 46.500 | 44.250 | 45.000 | 47.894 | 0.455 | -3.202 | -3.065 | -8.005 | -6.360 |
| | 990901 | 46.500 | 47.625 | 45.375 | 47.375 | 47.575 | 0.445 | -4.663 | 0.113 | -4.944 | -0.449 |
| | 990902 | 46.750 | 47.250 | 46.375 | 47.000 | 46.950 | 0.445 | -0.449 | 0.674 | -1.292 | 0.113 |
| | 990903 | 48.000 | 48.750 | 47.812 | 48.125 | 46.800 | 0.368 | 3.266 | 5.307 | 2.754 | 3.606 |
| | 990907 | 48.500 | 48.812 | 47.312 | 47.312 | 47.006 | 0.325 | 4.597 | 5.557 | 0.941 | 0.941 |
| | 990908 | 46.937 | 47.000 | 45.687 | 46.000 | 47.200 | 0.288 | -0.914 | -0.695 | -5.252 | -4.173 |
| | 990909 | 45.562 | 46.750 | 45.500 | 46.500 | 47.125 | 0.243 | -6.444 | -1.545 | -6.700 | -2.576 |
| | 990910 | 47.000 | 47.125 | 45.812 | 45.875 | 47.056 | 0.260 | -0.215 | 0.265 | -4.764 | -4.542 |
| | 990913 | 45.937 | 46.375 | 45.062 | 45.125 | 46.544 | 0.268 | -2.267 | -0.630 | -5.537 | -5.302 |
| | 990914 | 45.125 | 45.250 | 44.312 | 44.500 | 45.887 | 0.245 | -3.110 | -2.600 | -6.428 | -5.661 |
| | 990915 | 44.750 | 45.250 | 43.937 | 44.500 | 45.537 | 0.245 | -3.212 | -1.172 | -6.530 | -4.233 |
| | 990916 | 45.000 | 45.937 | 44.562 | 45.500 | 45.362 | 0.250 | -1.448 | 2.299 | -3.200 | 0.551 |
| | 990917 | 45.437 | 45.750 | 44.937 | 45.625 | 45.137 | 0.230 | 1.303 | 2.663 | -0.870 | 2.120 |
| | 990920 | 46.000 | 46.125 | 45.000 | 45.062 | 45.106 | 0.223 | 4.017 | 4.579 | -0.476 | -0.198 |
| | 990921 | 44.875 | 45.625 | 44.125 | 44.500 | 45.125 | 0.245 | -1.019 | 2.041 | -4.080 | -2.550 |
| | 990922 | 44.562 | 44.812 | 43.750 | 44.000 | 45.062 | 0.235 | -2.129 | -1.065 | -5.584 | -4.520 |
| | 990923 | 44.000 | 44.250 | 42.250 | 42.437 | 44.662 | 0.260 | -2.548 | -1.586 | -8.279 | -8.559 |
| | 990924 | 42.625 | 43.125 | 42.000 | 42.625 | 44.106 | 0.273 | -5.436 | -3.601 | -7.730 | -5.436 |
| | 990927 | 43.125 | 43.875 | 42.750 | 43.625 | 43.656 | 0.273 | -1.950 | 0.803 | -3.326 | -0.115 |
| | 990928 | 43.125 | 44.000 | 41.812 | 43.750 | 43.262 | 0.300 | -0.458 | 2.459 | -4.835 | 1.525 |
| | 990929 | 43.625 | 44.875 | 43.250 | 43.500 | 43.219 | 0.323 | 1.260 | 5.136 | 0.097 | 0.872 |
| | 990930 | 43.625 | 44.125 | 42.937 | 43.500 | 43.275 | 0.290 | 1.207 | 2.931 | -1.165 | 0.776 |

Figure 5

SYSTEMS AND METHODS FOR PRICE EVALUATION OF ARTICLES OF COMMERCE

CROSS-REFERENCE TO RELATED APPLICATIONS/INCORPORATION BY REFERENCE

This application is a continuation in part of U.S. patent application Ser. No. 12/272,942 filed Nov. 18, 2008, now U.S. Pat. No. 8,195,553 which issued on Jun. 5, 2012, which is a continuation of Ser. No. 09/536,328 filed Mar. 24, 2000, now U.S. Pat. No. 7,461,023 issued Dec. 2, 2008, the disclosures of which are incorporated herein by reference. This application claims priority to and the benefit of U.S. Provisional Patent Application No. 61/491,621, filed on May 31, 2011, and is incorporated herein by reference in its entirety.

FIELD OF THE INVENTION

The present invention relates generally to data processing and analysis relating to commodities, market trading or articles of commerce, and more specifically, to computer-implemented systems and techniques for producing enhanced valuation indicators, such as price charts, to allow investors to quickly and easily analyze the relative overbought or oversold state of any market and for generating quantifiable relative overbought, fair value and oversold price levels to drive (feed) automated trading systems or help investors strategically enter or exit markets or purchasing or selling articles of commerce, such as stocks, bonds, financial instruments, commodities or articles of commerce.

BACKGROUND OF THE INVENTION

In today's fast-paced financial markets, investors need to access information quickly and easily in order to process trading decisions. With the significant growth of online trading, individual investors need effective market analysis tools to help them make better trading decisions. Because the saying "a picture is worth a thousand words" still holds true, traders all over the world rely on traditional bar charts to display both past and present price activity. Bar charts are valuable because they reflect the history of price movement in an easy to process format (a picture.) An investor can literally analyze a chart in a glance. Although bar charts have proven to be valuable tools in the investment field, a frequently asked question is "are traditional bar (price) charts alone the most effective way define relative overbought price levels, relative oversold price levels, or fair value?" As will be shown, price can be displayed in a format which makes is possible to define the relative valuation of any market.

With the advancement in personal computers, the Internet, and online trading, trading in the stock (bonds, and futures) market has significantly increased in popularity. Investors have significant resources to utilize when determining what stock to buy or sell. However, until now, investors have not had a powerful charting tool that can quantify relative value and identify optimal market entry or exit price levels. A market analysis tool that can identify relative overbought and oversold price levels will potentially allow investors to lower their risk exposure (to loss) by helping buyers to enter markets at relatively oversold (undervalued) price levels and sellers to exit markets at relatively overbought (overvalued) price levels. Thus, buying at lower price levels and selling at higher price levels a trader is able to enhance his or her profit potential.

Furthermore, with the recent advancements in computers, many traders are now developing automated and/or mathematical computerized trading systems. These trading systems rely on quantifiable price levels to generate buy and sell signals. Until now, the most common quantifiable price levels used to drive trading systems have been the opening or closing price of a time period (day, week, month, 10-minute bar, etc.). The previous day's (or time period's) highs and lows have also been used as quantifiable reference price levels to direct trading systems to enter or exit markets. Any method or market analysis technique that could expand the number of quantifiable price or value levels to drive automated or mathematical trading systems would be extremely useful to traders, trading services and/or trading system designers.

SUMMARY OF THE INVENTION

The invention relates to further systems and methods to assist in market analysis and enhancing the systems and methods developed by the applicant. These systems and methods relate to producing information for facilitating the making of a trading decision by an investor. In an example, the system comprises a software program for providing a set of instructions to a computer to receive and process a collection of price data to generate volatility-adjusted relative price data related to the investment. The system generates an indication of a state of a market for the investment as being currently traded at a fair value, as overvalued or undervalued. The assessment of the volatility-adjusted relative price data may be made in relation to dynamic volatility intervals determined for the investment. The system and methods may be used in relation to commodities or other articles of trade, for buying and/or selling purposes. In an example, the system may include market analysis or calculation tools referred to as ValueCharts™ (sometimes hereafter designated "VC") and Price Action Profile™ (sometimes hereafter designated "PAP"). The tools ValueCharts™ and Price Action Profile™ reveal a hidden order in the markets, and allow a trader at a glance to gain insight into the relative valuation of a market or article of trade. The market, made up of many individual participants, is in a constant search for fair value across every time frame or other variable such as location, type of article of trade or the like. The systems and methods of the invention allow analysis of short-term and long term value.

The invention relates to additional systems and methods to utilize the concepts of ValueCharts™ and Price Action Profile™ that for example, will allow a trader to easily and quickly observe valuation levels and determine whether to enter or exit a particular market. Additional systems and methods are discussed below regarding the utilization of concepts underlying described examples of ValueCharts™, Price Action Profile™, and Dynamic Volatility Units™.

BRIEF DESCRIPTION OF THE DRAWINGS

FIG. 2 shows Example calculations for generating the relative chart of FIG. 1.

FIG. 5 shows example calculations for generating the ValueCharts™ shown in FIG. 4.

FIG. 7b shows a Price Action Profile™ generated from the daily ValueCharts™ of FIG. 7a.

DETAILED DESCRIPTION OF EMBODIMENTS

The concepts of the systems and methods of examples of the invention may be usable in conjunction with or independently from identifying relative overbought and oversold price levels of a traded article of commerce, or articles that are bought and sold in a marketplace. In an example, such an indication may be shown in a ValueCharts™ representation, being a graphical or other indication or representation of a trading system indicating trading at a fair value, overvalued or undervalued condition. The concepts of the invention may also be used in automated or mathematical trading system or in other ways. The system generates an indication of a state of a market for the investment as being currently traded at a fair value, as overvalued or undervalued, which can then be used to provide additional indications to assist in trading decisions.

In an example of generating a ValueCharts™, price bars are charted on a relative basis instead of an absolute basis. In this type of chart, such a relative basis may be based on any desired suitable variable, such as a period of time, location or region or otherwise. In an example, a simple 5-day moving average of the median bar chart price for a traded article of commerce as the reference axis. Therefore, instead of plotting price with respect to zero, the price is plotted (open, high, low, close or otherwise) with respect to this simple 5-day median moving average, which may be referred to as the floating axis. Price given in terms of its relation to the floating axis, instead of zero, may be referred to as relative price (see FIG. 1).

As an example, formulas for calculating a relative chart may be selected from any suitable formulas or basis, but for a 5-day median moving average basis, determining the data may use calculating the following: Median Price=(High+Low)÷2; Floating Axis=5-day moving average of Median Price; Relative Price=Price−Floating Axis.

Figure 1:
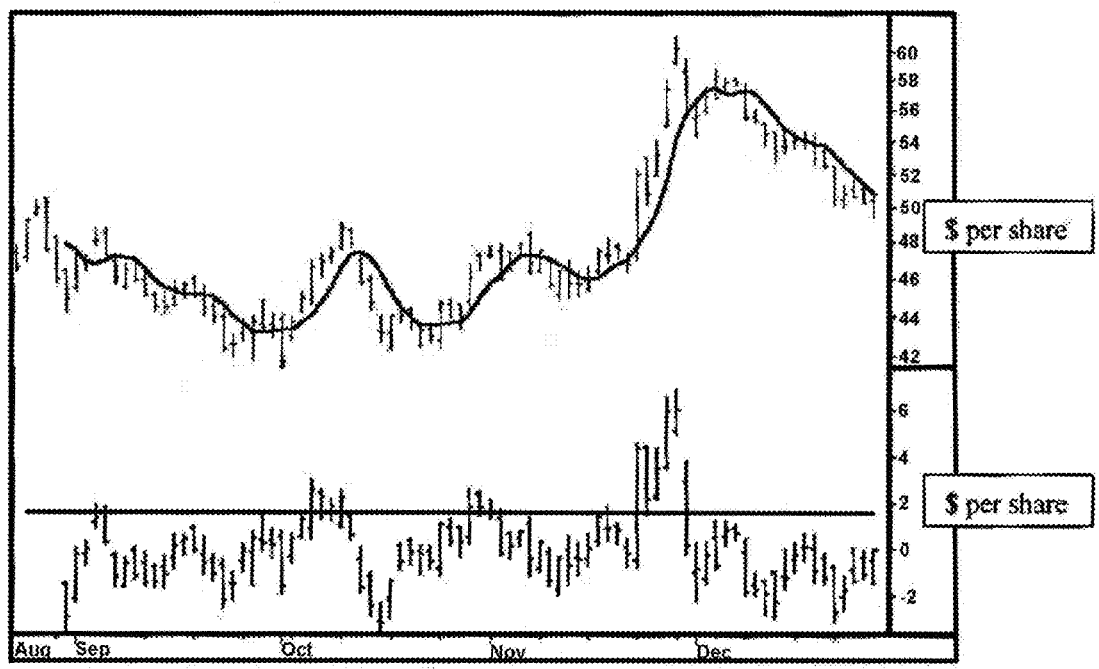
FIG. 1 shows a daily price chart (top) and relative price chart (bottom) for a particular market.

In the example of FIG. 1, the date, open, high, low, and close from the daily bar chart for a stock are listed in the first five columns of FIG. 2. By utilizing the Floating Axis formula displayed above, the Floating Axis may be determined in column 6. From this point, the relative price may be determined (reference FIG. 2). For example, taking the open price in column 2 and subtracting the Floating Axis value in column 6 to get the relative open in column 7. This process may be repeated for the high, low, and close or other parameters into the corresponding relative parameter. For example, from FIG. 2, the relative open for a date (first Row) may be determined as follows:

Open Floating Axis Relative Open $46.437 - 47.894 = -1.457$

Figure 3:
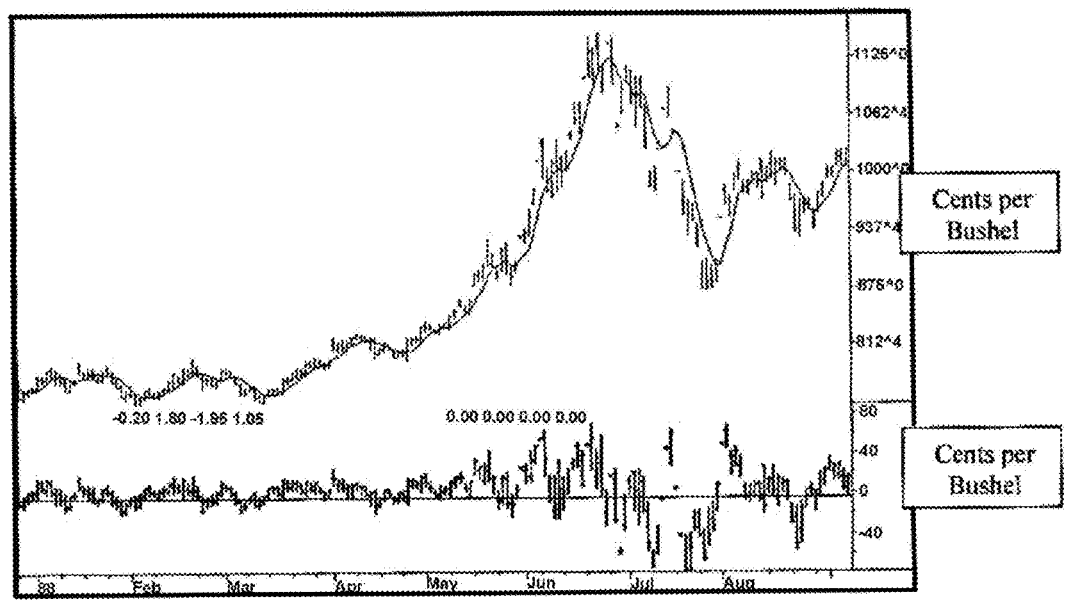
FIG. 3 shows a daily price chart (top) and relative price chart (bottom) for another market.

An example of a relative bar chart displayed below a traditional bar chart is shown in FIG. 3. This example, which displays a major bull market, illustrates how volatility can significantly increase as a bull market progresses. The relative chart reflects the relative movement of the market with respect to the floating axis. Upon inspection of the relative chart, it is evident that price tends to deviate more from the zero line (floating axis line) as markets become more volatile. Note that in FIG. 3, as the price became much more volatile on the right side of the chart (June through August timeframe) the relative price bars in the lower chart deviated much farther from the zero axis. As the relative price chart does not adjust to changing volatility conditions, in order for a relative chart to be more useful in identifying overbought and oversold price levels, adapting to changing market volatility is provided. In an example, this may be accomplished by characterizing the data taking into account volatility, such as by providing the y-axis units in the Relative Chart (displayed in FIG. 3) defined in terms of a dynamic volatility unit instead of a static price unit. The dynamic volatility unit allows volatility adjusted relative charts to be generated or to provide an indication in defining relative overbought and oversold price levels as market volatility changes over time. The volatility adjusted relative indicators, such as charts may be referred to as ValueCharts™

In an example, the dynamic volatility unit (DVU) may be defined in any suitable manner, to account for volatility. In line with the example above, the DVU may be characterized as 20% of the 5-day average of the volatility measurement (VM). The VM may be defined in any suitable manner, and as an example, as either the daily price range (High−Low) or today's close minus yesterday's close (C−C[1]), whichever is larger.

Figure 4:
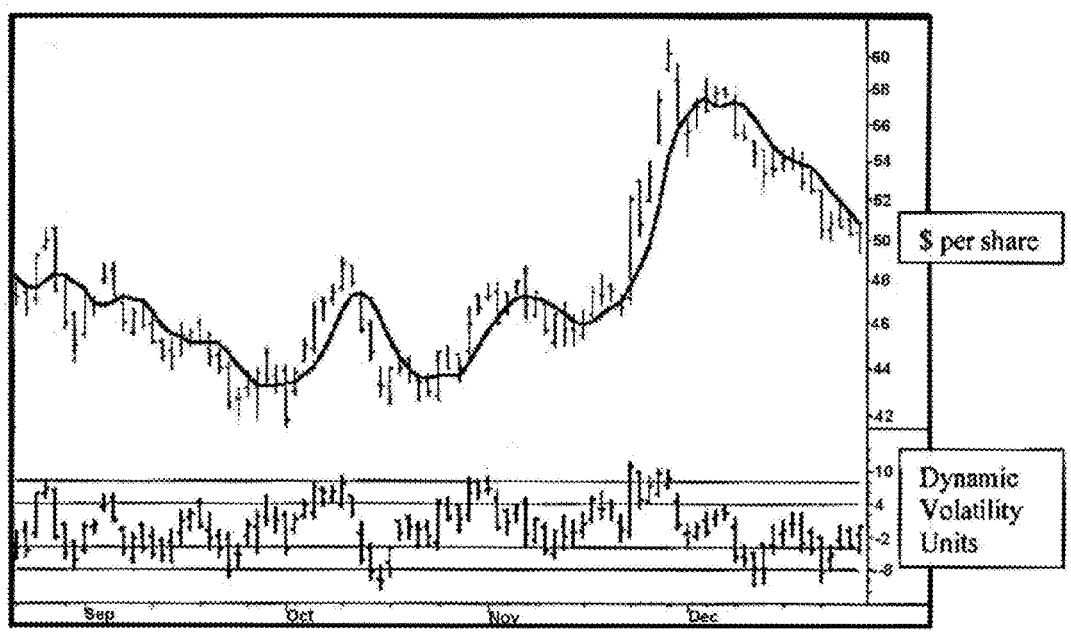
FIG. 4 shows a daily price chart (top) and a ValueCharts™ (bottom) according to an example.

As merely an example of a developing an indication of trading at a fair value, undervalued or overvalued condition, a chart, which may be referred to as a ValueCharts™, is formed using data adjusted for volatility. Calculations may use any suitable techniques to account for volatility, but as an example, the following formulas may be used:

Floating Axis=5-day moving average of ((High+Low)÷2);
for determining Dynamic Volatility Units (DVU)
If (High−Low)>(Close−Close[1]) then VM=(High−Low)
If (High−Low)<(Close−Close[1]) then VM=(Close−Close[1])
(Close−Close[1] means today's close minus yesterday's close for example)
Dynamic Volatility Units (DVU)=(5-day moving average of VM)*0.20
Value Price=(Price−Floating Axis)÷DVU As an example, the date, open, high, low, and close of the daily bar chart (as seen in FIG. 4) are listed in the first five columns of FIG. 5. By utilizing the Floating Axis formula, the Floating Axis is calculated in column 6 (refer to FIG. 5 for example calculations). By utilizing the Dynamic Volatility Unit formula, the Dynamic Volatility Unit (Volatility Unit) in column 7 (of FIG. 5) is calculated. From this point calculating a ValueCharts™ price is determined for example, by taking the open value in column 2 and subtracting the Floating Axis value in column 6, and then dividing this value by the Dynamic Volatility Unit in column 7 provides an example volatility adjusted or ValueCharts™ Open price in column 8. Repeating this process for the high, low, and close to calculate the volatility adjusted ValueCharts™ High, Low, and Close.

Figure 6:
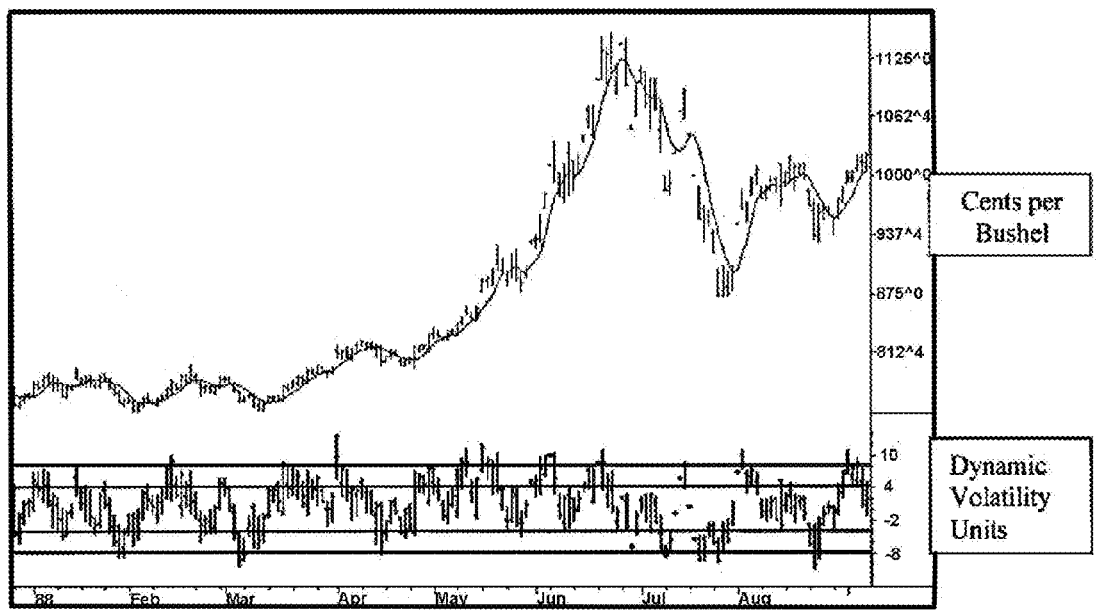
FIG. 6 shows a daily bar chart above a daily ValueCharts™

From FIG. 5 more particularly, the volatility adjusted Open can be calculated as follows:

Open Floating Axis Volatility Unit *ValueCharts* Open $(46.437 - 47.894) \div 0.455 = -3.202$ This example provides one suitable way to convert the traditional daily price chart, such as in the top of FIG. 3, into a volatility adjusted relative price chart, or ValueCharts™ (FIG. 6). As is seen in FIG. 6, the volatility adjusted relative price chart is effective in adjusting to changing volatility levels in the bull market. This or other suitable methods allow an indication different levels of volatility in any market and effectively define overbought and oversold relative price levels at these different levels. It should be understood that other suitable methods of volatility adjustment are contemplated within the scope of the invention.

This will allow traders to enter and exit markets at better, or more profitable, price levels, and provide the ability for online brokerage services to offer automated trading services based on one or more ValueCharts™ price levels or other information as will be described. Traders or others can now design and implement trading systems that enter or exit markets at volatility adjusted or ValueCharts™ price levels. Because ValueCharts™ works the same across every market by using the same universal overbought and oversold point scale, trading strategies no longer have to be revised to accommodate each unique market.

It is also provided that the volatility adjusted data developed can be used to provide a profile, or bell curve, that describes the historical behavior of volatility adjusted price information. These Profile may be referred to as Price Action Profile™ that display how frequently a ValueCharts™ has traded above, below, or in any given ValueCharts™ sector. Such a profile reflects the distribution of price information such as represented in price bars, in the different volatility intervals. The Profile may be generated by any suitable methods, and as an example, using the volatility adjusted price and trading data, the number of bars of a ValueCharts™ that trade in each volatility interval may be used to stack into the profile. For example, if there are first three bars in the ValueCharts™ trade in the (+1) volatility interval, the profile or Price Action Profile™ reflects this by having three layers in the (+1) volatility interval. As price bars are added to the ValueCharts™, the Price Action Profile™ will continue to stack these bars and eventually form the shape of a bell curve.

Figure 7A:
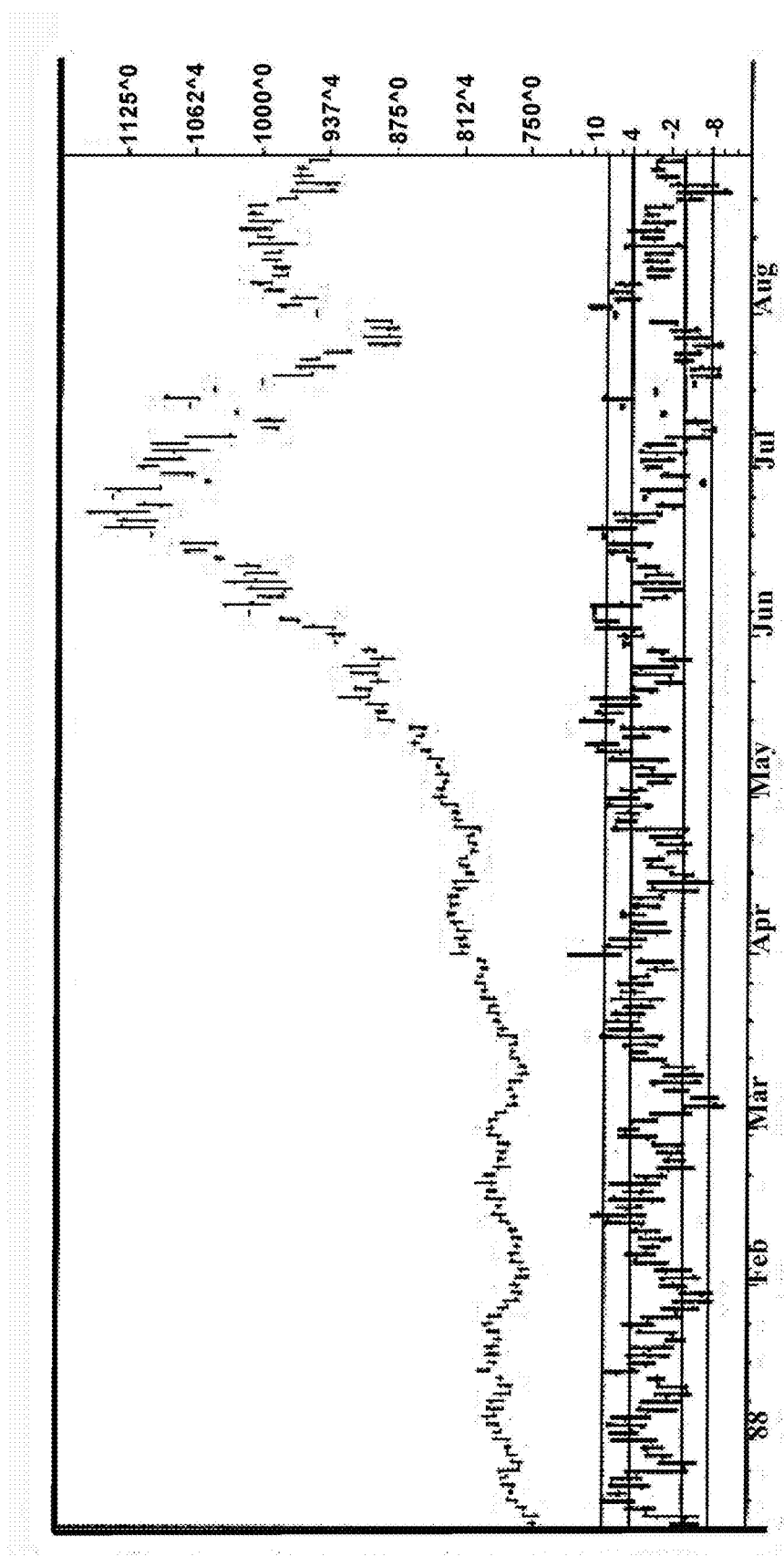
FIG. 7a shows a daily bar chart above a daily ValueCharts™.
Figure 7B:
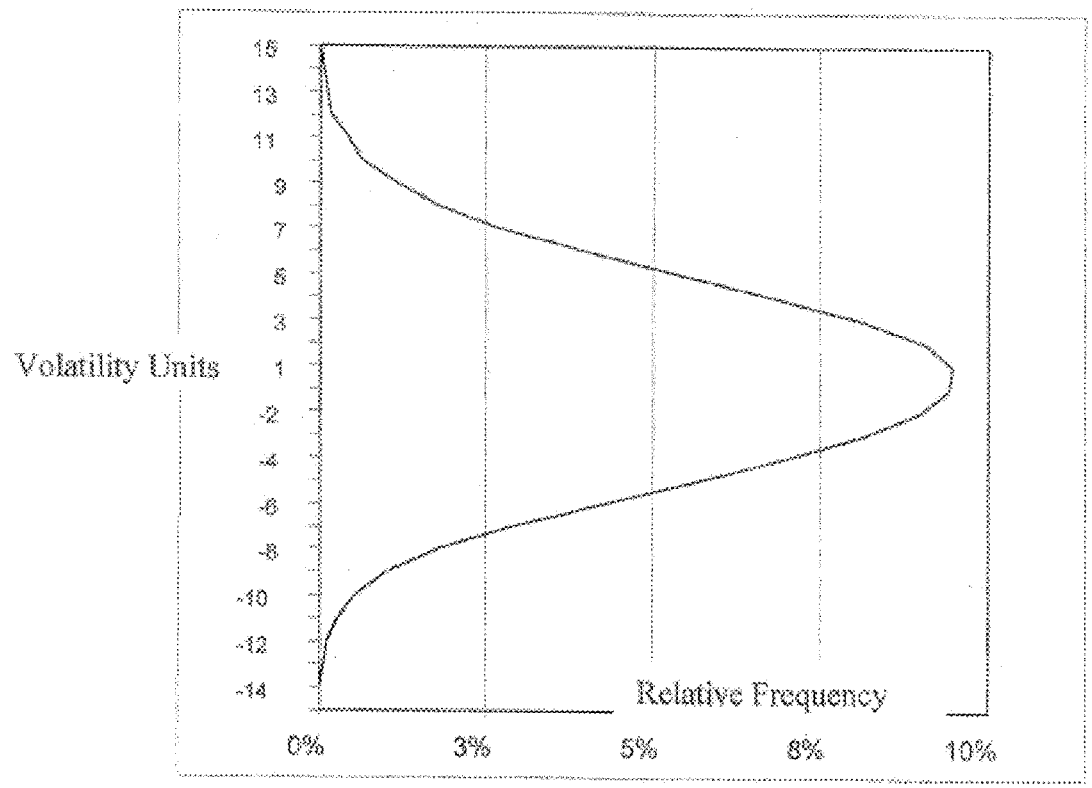

In an example, a Price Action Profile™ is generated for the ValueCharts™ displayed in FIG. 7*a*. The chart in FIG. 7*a* displays about nine months of price datum. A profile may be developed from this or from more extensive volatility adjusted price activity. Again, building a profile may be done by other suitable methods but may utilize stacking or sliding all of the ValueCharts™ daily price bars to the left. In this example, approximately 30 years of price datum was used to develop the frequency diagram or bell curve of ValueCharts™ price activity (displayed in FIG. 7*b*). Because the Price Action Profile™ in FIG. 7*b* closely resembles a normal bell curve, a trader can make inferences about the population (future prices) by analyzing this bell curve. As should be evident, having insight on the future price behavior of any market can lead to trading profits. By analyzing the Price Action Profile™, the trader can quantify the frequency in which the market trades in each ValueCharts™ interval.

As previously indicated, any type of price datum, including, but not limited to, tick charts, bar charts, candle stick charts, point & figure charts, any type of price charts, technical charts and charting indicators, price data of articles of trade or any other suitable datum, can be converted to volatility adjusted price data and used to provide an indication of value according to the invention. Similarly, the invention may substitute traditional time based price bars in the reference price chart or the like with non-time based prices bars (like tick bars) within the traditional price chart that is used to calculate the volatility adjusted data such as for ValueCharts and Price Action Profile. Other non-time based price bars or price points can also be considered.

The floating axis can be defined as any function of price. The distance that price lies away from the floating axis is directly related to the degree of buying and selling that has come into the market at that time. This may be designated F as the function that generates the floating axis values. The function (F) may be preset or is user defined and can be any function of price. In the example, F is defined as a five-day moving average of the median price in each of the five latest price bars. ValueCharts can be easily customized because the user has the capability to use any function of price for the floating axis. The sensitivity to price change that the user desires may be used to select how many price data points (such as price bars) will be taken into consideration in the calculation. The ability to customize the function for the floating axis gives the user the power to tailor Price Action Profile™ and ValueCharts™ to desired specifications. Although any suitable calculation may be used, an exemplary floating axis calculation may be:

M=Median Price=(H+L)/2
F=Floating Axis Function=(M+M[1]+M[2]+M[3]+M[4])/5
Brackets denote number of days ago: [Number of days ago]
Example: M[1]=Median price from one day ago (yesterday)
Once the floating axis has been defined, as described, an interval to represent the volatility adjustment, such as a unit value on the y-axis, which may be referred to as a Dynamic Volatility Unit™, is determined. This volatility adjustment may be used to indicate the relative value of an article of trade, and in an example, used to define the point value for the representation of the market, such as via ValueCharts™ for example. This interval can be any function of price. However, these dynamic intervals may be designed to expand and contract along with changing market volatility. This interval function may be designated as function (DVU). Like the function F for the floating axis, the function DVU may be user defined and can be any function of price. For our example, the DVU may be defined as a function that generates a dynamic volatility unit by taking a five-day moving average of a bar's trading range (H−L) or today's close minus yesterday's close, whichever is greater, and then dividing this value by 5.

Although any suitable calculation may be used, an exemplary interval or Dynamic Volatility Unit™ calculation is as follows:
R=(Price Range)=(H−L) or (C−C[1]){The greater of the two values}
A=Average 5-Day Price Range=(R+R[1]+R[2]+R[3]+R[4])/5
DVU=Dynamic Volatility Unit=A/5
Brackets denote number of days ago: [Number of days ago]
Example: R[1]=Price Range one day ago (yesterday)

The system and methods may generate a graphical representation as shown, and assume that the x-axis will reflect time, but other indicators or variables may be used. The y-axis on may be defined in terms of volatility units. The x-axis on Price Action Profile™ will be defined in terms of DVUs. The y-axis of Price Action Profile™ will be defined as a percentage of the relative frequency of occurrences of ValueCharts™ price bars contained in each corresponding dynamic volatility unit. Further information and applications regarding the systems and methods developed by the applicant, relating to producing information for facilitating the making of a trading decision by an investor are set forth in U.S. Pat. No. 7,461,023, which is hereby incorporated by reference. In an example, the system comprises a software program for providing a set of instructions to a computer to receive and process a collection of price data to generate volatility-adjusted relative price data related to the investment. The system generates an indication of a state of a market for the investment as being currently traded at a fair value, as overvalued or undervalued.

Alternative Formulas Usable for the Floating Axis and Dynamic Volatility Units
Other approaches or formulas may be used to calculate aspects of the invention, such as described in the following.

Another form of calculating the floating axis may be by utilizing a Simple Moving Average ("SMA") of Median Price with a user defined "lookback" period of time. The SMA may be calculated using any number of Median Price points, e.g. daily bars, 14 daily bars, ten 60-minute bars, 21 weekly bars, etc. The floating axis may also be calculated using other price data, other than Median Price points. For example, the floating axis may be calculated using a weighted average, an exponential average, or any other average known to one of ordinary skill in the art. In addition, a user may utilize supplementary variables in the floating axis formula, such as an error variable, a user defined formula, or a dampening variable. These variables allow the user to adjust the floating axis formula accordingly. Below are several example formulas that may be used to calculate the floating axis.

Floating Axis=Average ((H+L)÷2, N periods)
Floating Axis=Average (Price Formula or Price, N periods)
Floating Axis=Weighted Average (Price Formula or Price, N periods)
Floating Axis=Exponential Average (Price Formula or Price, N periods)
Floating Axis=User Defined Average (Price Formula or Price, N periods)
Floating Axis=User Defined Average (Price Formula or Price, N periods)±Error Formula
Floating Axis=User Defined Average (Price Formula or Price, N periods)±Dampening Formula
Floating Axis=User Defined Average (Price Formula or Price, N periods)*Error Formula
Floating Axis=User Defined Average (Price Formula or Price, N periods)*Dampening Formula
Floating Axis=User Defined Average (Price Formula or Price, N periods)±User Defined Formula
Floating Axis=Any User Defined Formula The Simple Moving Average may also be described as the unweighted mean of the previous "n" data points. This allows for variations in the mean to be aligned with the variations in the data rather than being shifted with respect to time. An example of a simple unweighted running mean for a 10-day sample of closing price is the mean of the previous 10 days' closing prices. If those prices are $p_M, p_{M-1}, \ldots, p_{M-9}$, then the formula is:

$$SMA = \frac{p_M + p_{M-1} + \ldots + p_{M-9}}{10}$$

When calculating successive values, a new value comes into the sum and an old value drops out, i.e. a full summation each time is unnecessary for this simple case, $$SMA_{today} = SMA_{yesterday} - \frac{p_{M-n}}{n} + \frac{p_M}{n}$$

Additionally, the period selected depends on the type of movement of interest, such as short, intermediate, or long term. Moving average levels can be interpreted as resistance in a rising market, or support in a falling market.

If the data used is not centered around the mean, the Simple Moving Average lags behind the latest data point by half the sample width. A SMA can also be disproportionately influenced by old data points dropping out or new data points coming in. One characteristic of the SMA is that if the data has a periodic fluctuation, then applying a SMA of that period may eliminate that variation, wherein the average usually contains one complete cycle. However, a perfectly regular cycle is rarely encountered.

For a number of applications, it may be advantageous to avoid shifting that may be induced by using only "past" data. Thus, a central moving average may be computed, using data equally spaced on either side of the point, in the series, where the mean is calculated. This may require using an odd number of data points in the sample window.

Other type of averages (means) may include, a Weighted Moving Average, an Exponential Moving Average, a Cumulative Moving Average, a Volume Weighted Average (weighting each period in proportion to its volume), a Modified Moving Average, a Running Moving Average, a Smoothed Moving Average, a Moving Median, a Filtered Average, an Adaptive Moving Average, a Geometric Mean, and any function, mean, or average of price and/or volume or open interest known to one of ordinary skill in the art.

In a Cumulative Moving Average ("CMA"), the data may arrive in an ordered data stream, wherein a user may receive an average of all the data collected up until the current data point. For example, an investor may want the average price of all of the stock transactions for a particular stock up until the current time. As each new transaction occurs, the average price at the time of the transaction can be calculated for all of the transactions up to that point using the cumulative average. Typically, an unweighted average of the sequence of i values $x_1, \ldots, x_i$ up to the current time is:

$$CA_i = \frac{x_1 + \ldots + x_i}{i}.$$

An example of a method to calculate this would be to store all of the data, calculate the sum, and then divide by the number of data points every time a new data point arrives. However, it is possible to simply update the cumulative average as a new value $x_{i+1}$, when it becomes available, using the formula:

$$CA_{i+1} = \frac{x_{i+1} + iCA_i}{i+1},$$

where $CA_0$ can be taken to be equal to 0.

Thus, the current cumulative average for a new data point is equal to the previous cumulative average plus the difference between the latest data point and the previous average, divided by the number of points received so far. When all of the data points arrive (i=N), the cumulative average will equal the final average.

The derivation of the cumulative average formula is presented below, using $\chi_1 + \ldots + \chi_i = iCA_i$, and similarly for i+1, it is seen that $\chi_{i+1} = (\chi_1 + \ldots + \chi_{i+1}) - (\chi_1 + \ldots + \chi_i) = (i+1) CA_{i+1} - iCA_i$.

Solving this equation for $CA_{i+1}$ results in:

$$CA_{i+1} = \frac{(x_{i+1} + iCA_i)}{i+1} = CA_i + \frac{x_{i+1} - CA_i}{i+1}.$$

A weighted average may be any average that has multiplying factors to give different weights to data at different positions in the sample window. Mathematically, the moving average is the convolution of the data points with a fixed weighting function.

A Weighted Moving Average ("WMA") has the specific meaning of weights that decrease arithmetically. In an n-day, the WMA has the latest day has weight n, the second latest n−1, etc, down to one.

$$WMA_M = \frac{np_M + (n-1)p_{M-1} + \ldots + 2p_{(M-n+2)} + p_{(M-n+1)}}{n + (n-1) + \ldots + 2 + 1}$$

The denominator is a triangle number and can be easily computed as $$\frac{n(n+1)}{2}.$$

Generally, the denominator may usually be the sum of the individual weights.

When calculating the WMA across successive values, it can be noted that the difference between the numerators of $WMA_{M+1}$ and $WMA_M$ is $np_{M+1} - p_M - \ldots - p_{M-n+1}$. If we denote the sum $p_M + \ldots + p_{M-n+1}$ by $Total_M$, then $$Total_{M+1} = Total_M + p_{M+1} - p_{M-n+1}$$

$$Numerator_{M+1} = Numerator_M + np_{M+1} - Total_M$$

$$WMA_{M+1} = \frac{Numerator_{M+1}}{n + (n-1) + \ldots + 2 + 1}$$

Figure 17:
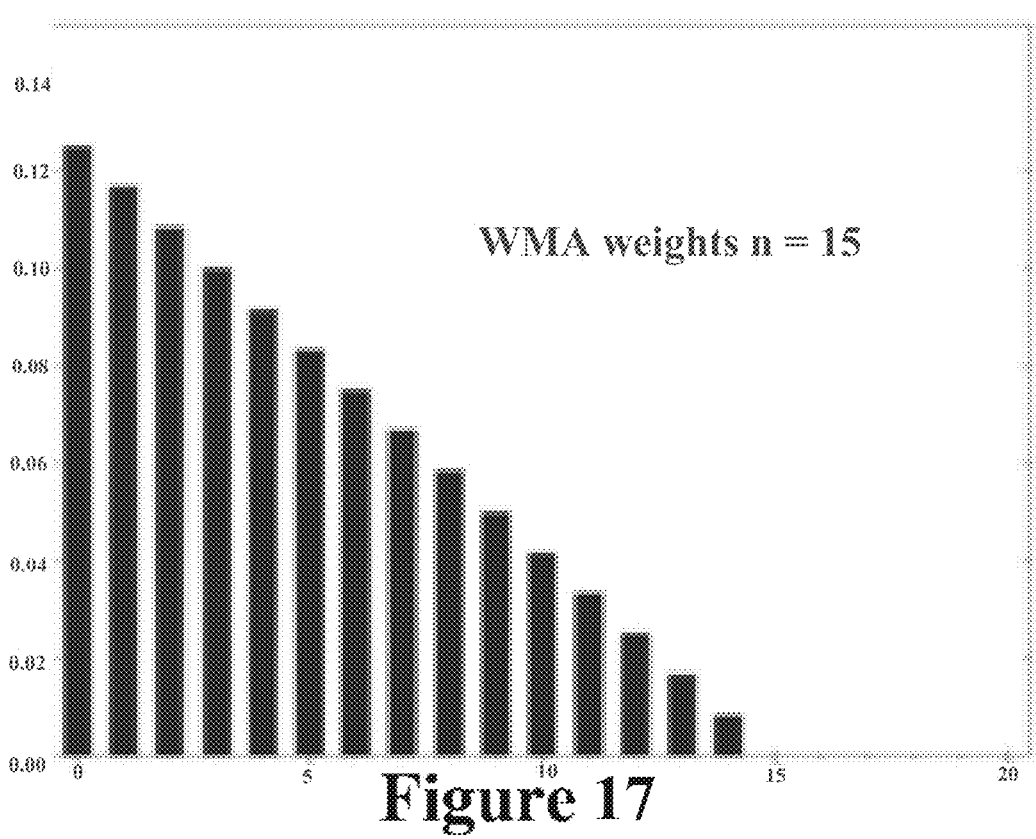
FIG. 17 displays, when calculating Weighted Moving Average ("WMA") across successive values, how the weights decrease, from highest weight for the most recent data points, down to zero.

FIG. 17 shows how the weights decrease, from highest weight for the most recent data points, down to zero.

Figure 18:
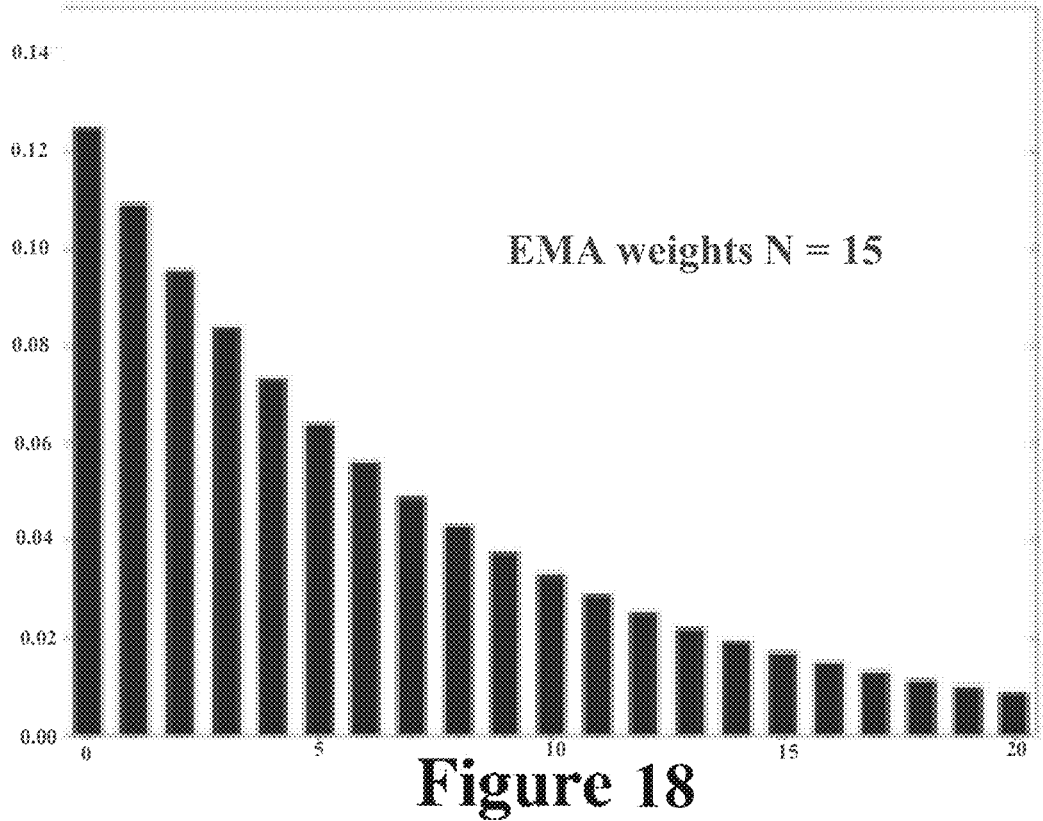
FIG. 18 displays an example of weight decreases in an Exponentially Moving Average ("EMA"), a type of infinite impulse response filter that applies weighting factors that decrease exponentially but never reaching zero.

An Exponential Moving Average ("EMA"), also known as an Exponentially Weighted Moving Average ("EWMA"), is a type of infinite impulse response filter that applies weighting factors that decrease exponentially. The weighting for each older data point decreases exponentially, but never reaches zero. FIG. 18 shows an example of the weight decrease.

The formula for calculating the EMA at time periods t>2 is $$S_t = \alpha \times Y_{t-1} + (1-\alpha) \times S_{t-1}.$$

Where:

The coefficient $\alpha$ represents the degree of weighting decrease, a constant smoothing factor between 0 and 1. A higher $\alpha$ discounts older observations faster. Alternatively, $\alpha$ may be expressed in terms of N time periods, where $\alpha = 2/(N+1)$. For example, N=19 is equivalent to $\alpha = 0.1$. The half-life of the weights (the interval over which the weights decrease by a factor of two) is approximately N/2.8854 (within 1% if N>5).

$Y_t$ is the observation at a time period t.

$S_t$ is the value of the EMA at any time period t.

$S_1$ is undefined. $S_2$ may be initialized in a number of different ways, most commonly by setting $S_2$ to $Y_1$. Other techniques exist, such as setting $S_2$ to an average of the first 4 or 5 observations. The prominence of the $S_2$ initialization's effect on the resultant moving average depends on $\alpha$; smaller $\alpha$ values make the choice of $S_2$ relatively more important than larger $\alpha$ values, since a higher $\alpha$ discounts older observations faster.

By repeated application of this formula for different times, we can eventually write $S_t$ as a weighted sum of the data points $Y_t$, as:

$$S_t = \alpha \times (Y_{t-1} + (1-\alpha) \times Y_{t-2} + (1-\alpha)^2 \times Y_{t-3} + \ldots + (1-\alpha)^k \times Y_{t-(k+1)}) + (1-\alpha)^{k+1} \times S_{t-(k+1)}$$

for any suitable k=0, 1, 2, . . . The weight of the general data point $Y_{t-i}$ is $\alpha(1-\alpha)^{i-1}$.

An alternate approach includes using $Y_t$ in lieu of $Y_{t-1}$:

$$S_{t,alternate} = \alpha \times Y_t + (1-\alpha) \times S_{t-1}$$

This formula can also be expressed as showing how the EMA steps towards the latest data point, but only by a proportion of the difference (each time):

$$EMA_{today} = EMA_{yesterday} + \alpha \times (price_{today} - EMA_{yesterday})$$

Expanding out $EMA_{yesterday}$ each time results in the following power series, showing how the weighting factor on each data point $p_1$, $p_2$, etc, decreases exponentially:

$$EMA = \alpha \times (p_1 + (1-\alpha)p_2 + (1-\alpha)^2 p_3 + (1-\alpha)^3 p_4 + \ldots)$$

This is an infinite sum with decreasing terms. The N periods in an N-day EMA only specify the $\alpha$ factor. N is not a stopping point for the calculation in the way it is in an SMA or WMA. For sufficiently large N, the first N data points in an EMA represent about 86% of the total weight in the calculation:

$$\frac{\alpha \times (1 + (1-\alpha) + (1-\alpha)^2 + \ldots + (1-\alpha)^N)}{\alpha \times (1 + (1-\alpha) + (1-\alpha)^2 + \ldots + (1-\alpha)^\infty)} = 1 - \left(1 - \frac{2}{N+1}\right)^{N+1}$$

i.e. $\lim_{N \to \infty} \left[ 1 - \left(1 - \frac{2}{N+1}\right)^{N+1} \right]$ simplified, tends to $1-e^{-2} \approx 0.8647$.

The power formula above gives a starting value for a particular day, after which a successive day formula shown previously can be applied. The question of how far back to go for an initial value depends, in the worst case, on the data. Large price values in old data may affect the total, even if their weighting is very small. If prices have small variations, then just the weighting can be considered. The weight omitted by stopping after k terms is $$\alpha \times ((1-\alpha)^k + (1-\alpha)^{k+1} + (1-\alpha)^{k+2} + \ldots),$$

which is $$\alpha \times ((1-\alpha)^k \times (1+(1-\alpha)+(1-\alpha)^2+\ldots),$$

i.e. a fraction, $$\frac{\text{weight omitted by stopping after } k \text{ terms}}{\text{total weight}} = \frac{\alpha \times [(1-\alpha)^k + (1-\alpha)^{k+1} + (1-\alpha)^{k+2} + \ldots]}{\alpha \times [1 + (1-\alpha) + (1-\alpha)^2 + \ldots]}$$

$$= \frac{\alpha(1-\alpha)^k \times \frac{1}{1-(1-\alpha)}}{\frac{\alpha}{1-(1-\alpha)}}$$

$$= (1-\alpha)^k$$

out of the total weight.

For example, to have 99.9% of the weight, set the above ratio to equal 0.1% and solve for k:

$$k = \frac{\log(0.001)}{\log(1-\alpha)}$$

terms should be used. Since $\log(1-\alpha)$ approaches $$\frac{-2}{N+1}$$

as N increases, this simplifies to approximately $$k = 3.45(N+1)$$

for this example (i.e., 99.9% weight).

A Modified Moving Average ("MMA"), Running Moving Average ("RMA"), or Smoothed Moving Average ("Smooth MA") is defined as:

$$MMA_{today} = \frac{(N-1) \times MMA_{yesterday} + \text{price}}{N}$$

In other words, the formula above may also be an exponential moving average, with $\alpha=1/N$.

Some computer performance metrics, e.g. the average process queue length or the average CPU utilization, use a form of exponential moving average, as shown below.

$$S_n = \alpha(t_n - t_{n-1}) \times Y_n + (1 - \alpha(t_n - t_{n-1})) S_{n-1}.$$

According to the formula, $\alpha$ is defined as a function of time between two readings. An example of a coefficient giving more weight to the current reading and less weight to the older readings is:

$$\alpha(t_n - t_{n-1}) = 1 - \exp\left(-\frac{t_n - t_{n-1}}{W \times 60}\right)$$

where time for readings $t_n$ is expressed in seconds. W is the period of time, in minutes, over which the reading is said to be averaged (the mean lifetime of each reading in the average). Given the above definition of $\alpha$, the moving average can be expressed as:

$$S_n = \left(1 - \exp\left(-\frac{t_n - t_{n-1}}{W \times 60}\right)\right) \times Y_n + e^{-\frac{t_n - t_{n-1}}{W \times 60}} \times S_{n-1}.$$

For example, a 15-minute average L of a process queue length Q, measured every 5 seconds (time difference is 5 seconds), is computed as $$L_n = \left(1 - \exp\left(-\frac{5}{15 \times 60}\right)\right) \times Q_n + e^{\frac{5}{15 \times 60}} \times L_{n-1} =$$

$$\left(1 - \exp\left(-\frac{1}{180}\right)\right) \times Q_n + e^{1/180} \times L_{n-1} = Q_n + e^{1/180} \times (L_{n-1} - Q_n)$$

Other weighting systems include Volume Weighting ("VW"), in share trading a Volume Weighting may weight each time period in proportion to its trading volume. A further weighting includes a Spencer's 15-Point Moving Average (i.e., a central moving average). The symmetric weight coefficients may include −3, −6, −5, 3, 21, 46, 67, 74, 67, 46, 21, 3, −5, −6, −3.

Furthermore, weighted running means have many forms and applications. Each weighting function or "kernel" has its own characteristics. In engineering and science fields, the frequency and phase response of the filter is often of primary importance in understanding the desired and undesired distortions that a particular filter may apply to the data.

A mean does not just "smooth" the data. A mean may be a form of a low-pass filter. The effects of the particular filter used should be understood in order to make an appropriate choice.

From a statistical point of view, the moving average, when used to estimate the underlying trend in a time series, is susceptible to rare events such as rapid shocks or other anomalies. A more robust estimate of the trend is a Simple Moving Median ("SMM"), over n time points:

$$SMM = \text{Median}(p_M, p_{M-1}, \ldots, p_{M-n+1})$$

where the median is found by, for example, sorting the values inside the brackets and finding the value in the middle.

Statistically, the moving average is optimal for recovering the underlying trend of the time series, when the fluctuations about the trend are normally distributed. However, the normal distribution does not place high probability on very large deviations from the trend, which is why such deviations may have a disproportionately large effect on the trend estimate. It can be shown that if the fluctuations are instead assumed to be Laplace distributed, then the moving median is statistically optimal. For a given variance, the Laplace distribution places higher probability on rare events than does the normal, which explains why the moving median tolerates shocks better than the moving mean.

When the simple moving median is central, the smoothing may be identical to the median filter.

The Geometric Mean ("GM") of a data set $\{\alpha_1, \alpha_2, \ldots, \alpha_n\}$ is given by:

$$\left(\prod_{i=1}^{n} a_i\right)^{1/n} = \sqrt[n]{a_1 a_2 \ldots a_n}.$$

The geometric mean of a data set is less than or equal to the data set's arithmetic mean, i.e. the two means are equal if and only if all members of the data set are equal. This allows the definition of the arithmetic-geometric mean to be a mixture of the two.

The geometric mean may also be an Arithmetic-Harmonic Mean ("AHM"), wherein, if two sequences $(a_n)$ and $(h_n)$ are defined:

$$a_{n+1} = \frac{a_n + h_n}{2}, \quad a_0 = x$$

and $$h_{n+1} = \frac{2}{\frac{1}{a_n} + \frac{1}{h_n}}, \quad h_0 = y$$

then $a_n$ and $h_n$ will converge to the geometric mean of x and y.

According to the Bolzano-Weierstrass theorem, the sequences may converge at a common limit and the geometric mean may also be preserved:

$$\sqrt{a_i h_i} = \sqrt{\frac{a_i + h_i}{\frac{a_i + h_i}{h_i a_i}}} = \sqrt{\frac{a_i + h_i}{\frac{1}{a_i} + \frac{1}{h_i}}} = \sqrt{a_{i+1} h_{i+1}}.$$

Replacing the arithmetic and the harmonic mean by a pair of generalized means of opposite, finite exponents yield similar results.

By using logarithmic identities to transform a formula, the multiplications can be expressed as a sum and the power can be expressed as a multiplication, as shown below.

$$\left(\prod_{i=1}^{n} a_i\right)^{1/n} = \exp\left[\frac{1}{n} \sum_{i=1}^{n} \ln a_i\right]$$

This is sometimes called a Log-Average ("LA"). It is simply computing the arithmetic mean of the logarithm-transformed values of $a_i$ (i.e., the arithmetic mean on the log scale) and then using the exponentiation to return the computation to the original scale, i.e., it is the generalized f-mean with $f(x)=\log x$. For example, the geometric mean of 2 and 8 can be calculated as:

$$b^{(\log_b(2)+\log_b(8))/2} = 4,$$

where b is any base of a logarithm (commonly 2, e or 10).

If a set of non-identical numbers are subjected to a mean-preserving spread, i.e. two or more elements of the set are "spread apart" from each other while leaving the arithmetic mean unchanged, then the geometric mean decreases.

In cases where the geometric mean is being used to determine the average growth rate of a particular quantity, and the initial and final values $a_0$ and $a_n$ of that quantity are known, the product of the measured growth rate at every step need not be taken. Instead, the geometric mean is simply:

$$\left(\frac{a_n}{a_0}\right)^{\frac{1}{n}},$$

where n is the number of steps from the initial to final state.

If the values are $\alpha_0, \ldots, \alpha_n$, then the growth rate between measurement $a_k$ and $a_{k+1}$ is $a_{k+1}/a_k$. The geometric mean of these growth rates are:

$$\left(\frac{a_1}{a_0} \frac{a_2}{a_1} \ldots \frac{a_n}{a_{n-1}}\right)^{\frac{1}{n}} = \left(\frac{a_n}{a_0}\right)^{\frac{1}{n}}.$$

The Dynamic Volatility Unit may be calculated using a Simple Moving Average ("SMA") of a True Range function with a user defined "lookback" period. Similar to the Floating Axis, it is possible to use a Weighted Average, an Exponential Average, or any other user defined average of price volatility. Other functions outside of True Range functions may also be used to define market volatility. In addition, the "lookback" period may also be defined as any number of time units, such as days, 60-minute bars, minutes, weeks, etc. The user may also include an error variable, a user defined formula, or a dampening variable into the Volatility Unit equation. Shown below are various methods of calculating a volatility unit according to the present invention.

Volatility Unit=Average (True Range, N periods)
Volatility Unit=Average (Volatility Formula, N periods)
Volatility Unit=Weighted Average (Volatility Formula, N periods)
Volatility Unit=Exponential Average (Volatility Formula, N periods)
Volatility Unit=User Defined Average (Volatility Formula, N periods)
Volatility Unit=User Defined Average (Volatility Formula, N periods)±Error Formula
Volatility Unit=User Defined Average (Volatility Formula, N periods)±Dampening Formula
Volatility Unit=User Defined Average (Volatility Formula, N periods) Error Formula
Volatility Unit=User Defined Average (Volatility Formula, N periods) Dampening Formula
Volatility Unit=User Defined Average (Volatility Formula, N periods)±User Defined Formula
Volatility Unit=User Defined Average (Volatility Formula, N periods)±User Defined Formula
Volatility Unit=Any User Defined Formula It is conceivable to create a conditional formula that utilizes different ValueCharts™ formulas during different market conditions. In other words, one ValueCharts™ formula may be more effective during one type of market, while another ValueCharts™ formula may be more effective during a different type of market.

For market condition A then (Price−Floating Axis Formula A)÷Volatility Unit formula A=ValueCharts™ Price For market condition B then (Price−Floating Axis Formula B)÷Volatility Unit formula B=ValueCharts™ Price For market condition C then (Price−Floating Axis Formula B)÷Volatility Unit formula C=ValueCharts™ Price . . .

Additionally, a user may introduce an error variable, a user defined formula, or a dampening variable into the ValueCharts™ equation. It is possible to introduce integrals, differential equations, equations based on calculus, or logarithmic equations into the ValueCharts™ equation in order to improve it.

(Price−Floating Axis)÷Volatility Unit±Error Variable=ValueCharts™ Price (Price−Floating Axis)÷Volatility Unit±Dampening Variable=ValueCharts™ Price (Price−Floating Axis)÷Volatility Unit±User Defined Formula=ValueCharts™ Price (Price−Floating Axis)÷Volatility Unit*Error Variable=ValueCharts™ Price (Price−Floating Axis)÷Volatility Unit*Dampening Variable=ValueCharts™ Price (Price−Floating Axis)÷Volatility Unit*User Defined Formula=ValueCharts™ Price The above features represent some of the features that the ValueCharts™ and Price Action Profiles™ concepts may include. The attached figures show potential layouts for the visual displays, but are not inclusive of all of the possible combinations. The manner of calculating the volatility adjusted price information according to the concepts of the invention can vary and any suitable approach is contemplated.

Alternatively, the concepts may be implemented in an on-line system or global computer network, or even providing hard copies of the charts and information generated. These are also just examples of how the concepts can be implemented, and any other approach is within the scope of the invention.

Figure 8:
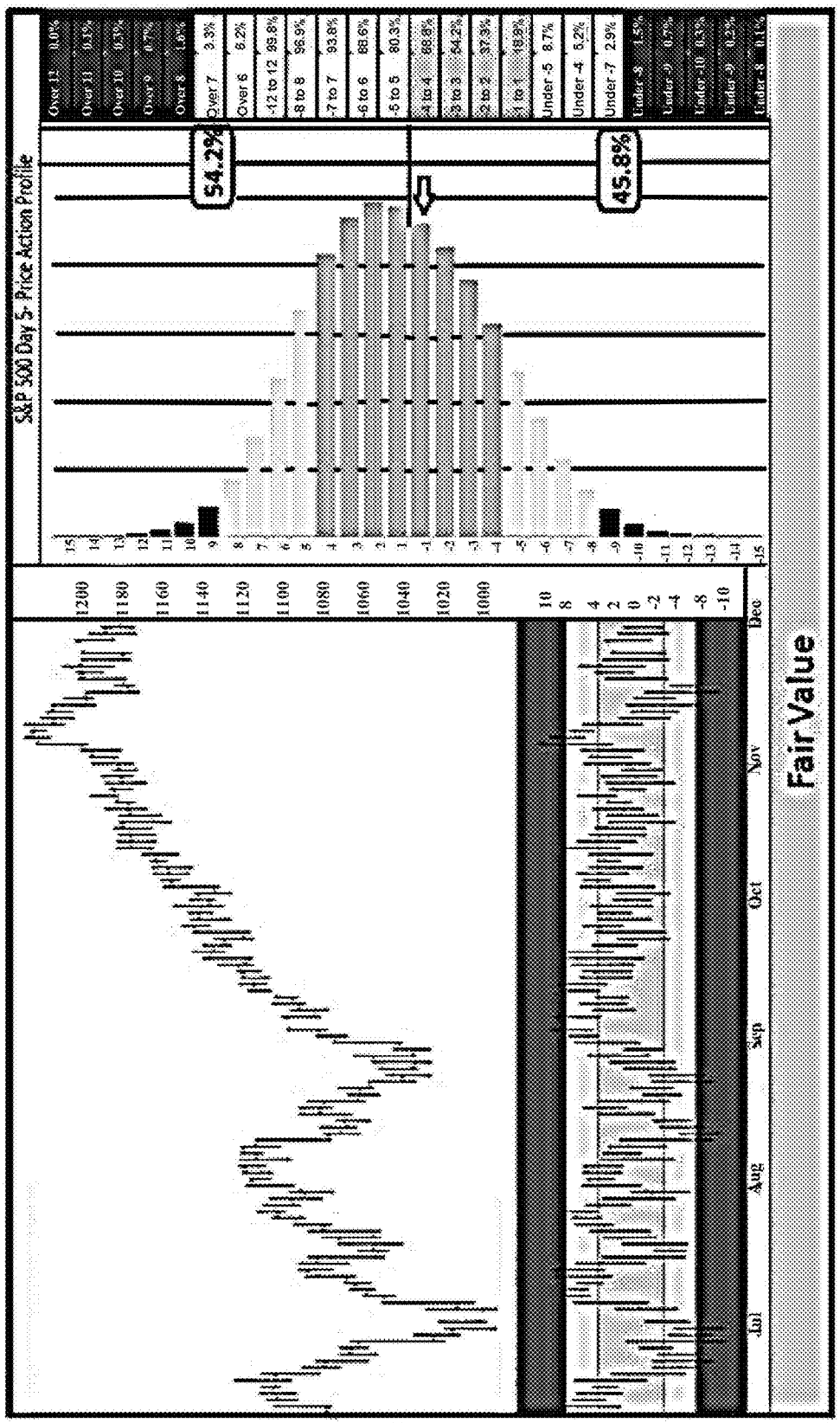
FIG. 8 displays a Master ValueCharts Window™ according to an embodiment of the present invention.

Referring to FIG. 8, a Master ValueCharts™ window is shown and may include sub-graphs such as a traditional price chart in the upper left hand corner, a ValueCharts™ directly below the traditional price chart in the lower left hand corner, a Price Action Profile™ on the right hand side of the Master ValueCharts Window™, that may also include a Price Action Profile™ grid along with a percentage indicator of trading activity, and a Status Bar at the bottom of the Master ValueCharts Window™, indicating the current ValueCharts™ valuation state, which may be colored green for example as shown with the status "Fair Value." The various displays may use colors, such as green for fair value, yellow for moderately overvalued or undervalued and red for significantly overvalued and undervalued ranges represent approximately the range, for example.

Figure 9:
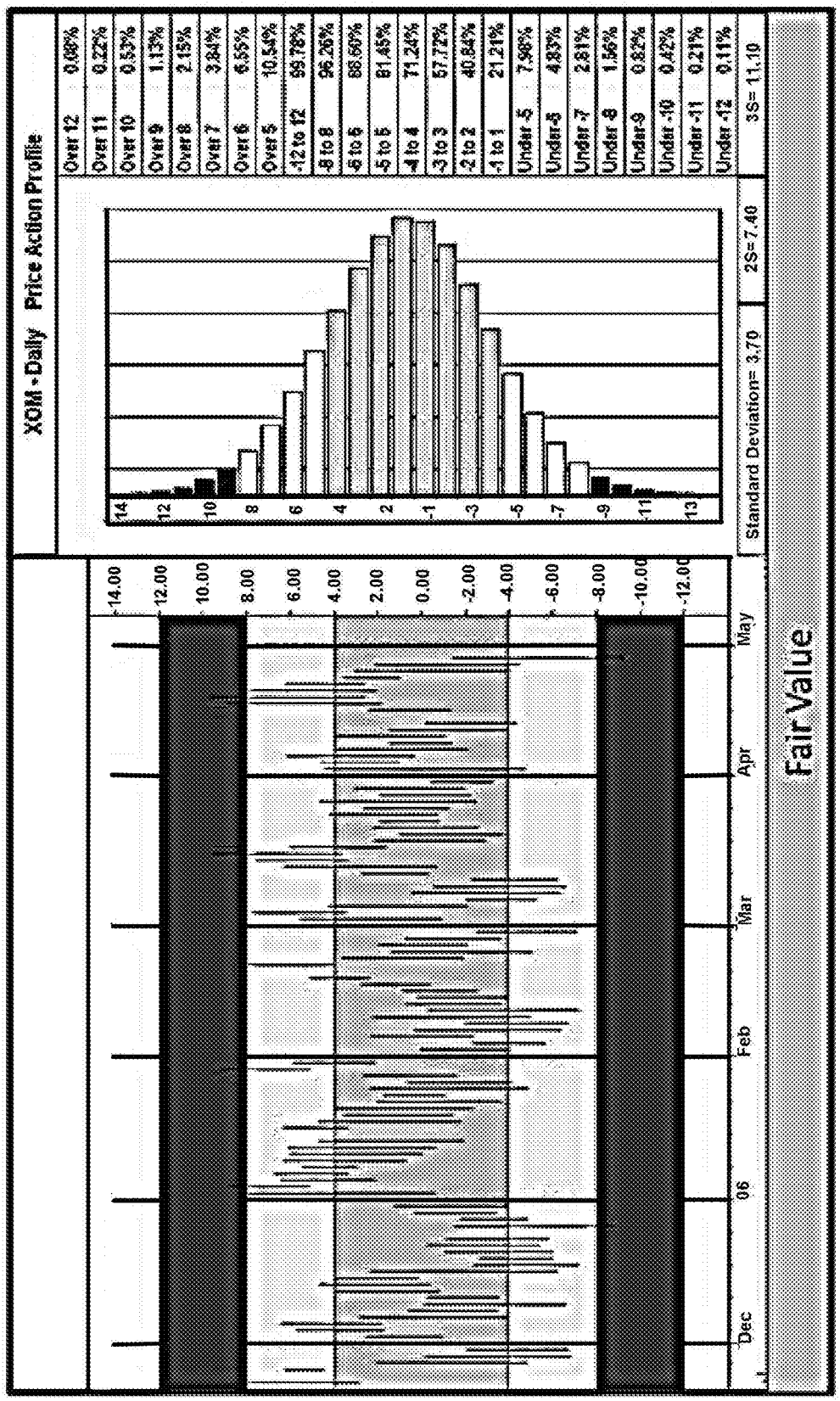
FIG. 9 displays a Master ValueCharts Window without a traditional price chart.
Figure 10:
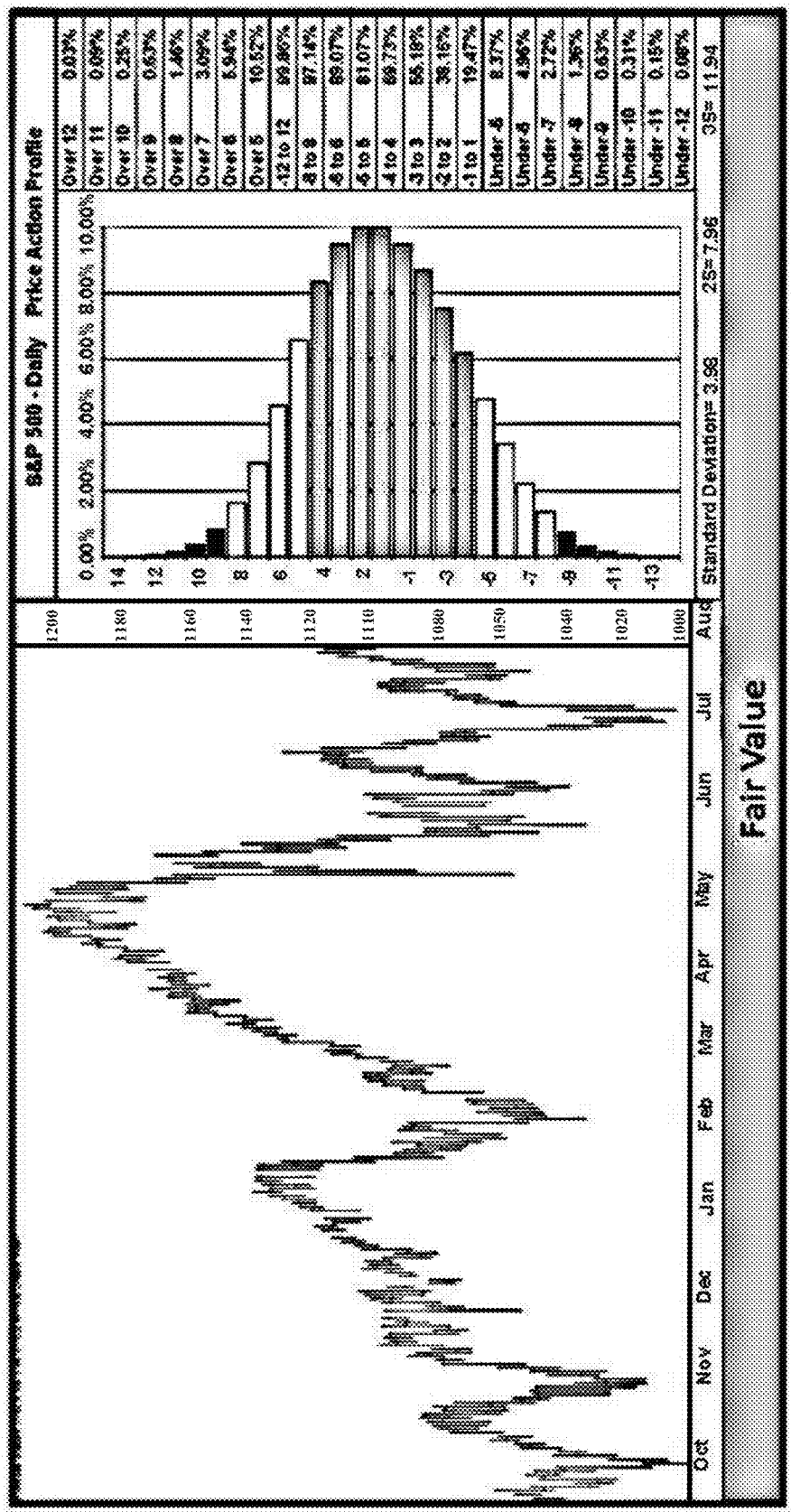
FIG. 10 displays a Master ValueCharts Window™ without a ValueCharts™.
Figure 11:
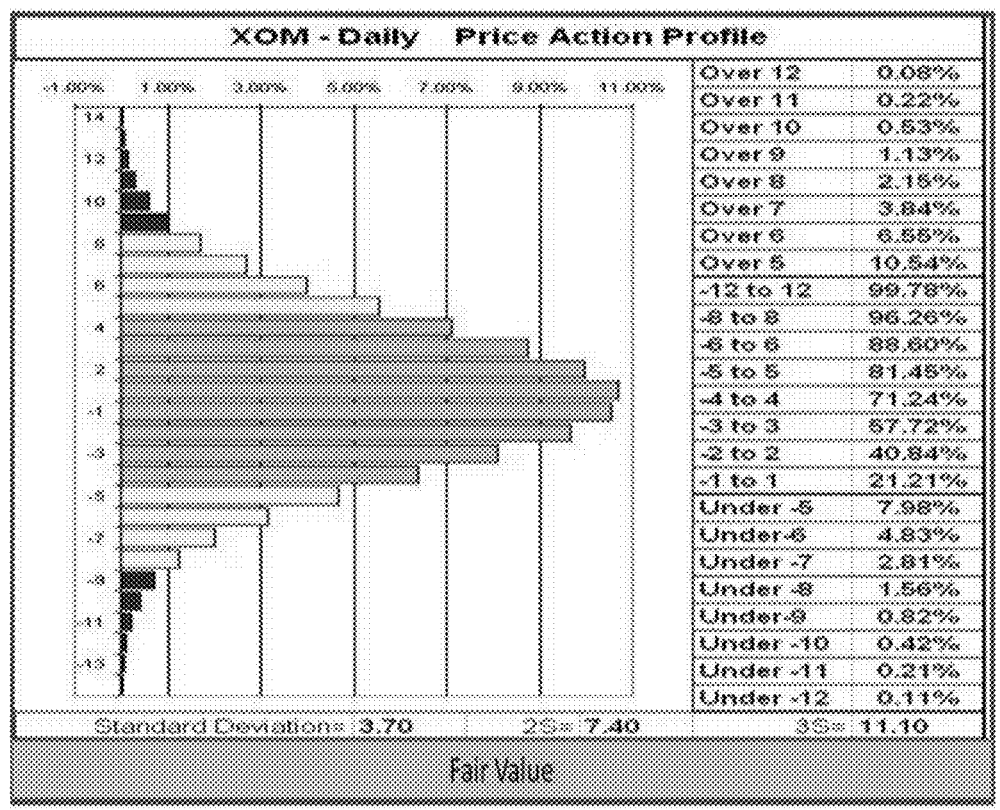
FIG. 11 displays a Master ValueCharts Window™ without a traditional price chart and a ValueCharts™.

Each sub-graph may be maximized or minimized in a given window, with respect to the Master ValueCharts Window™, as shown in FIGS. 9 through 11. FIG. 9 displays the Master ValueCharts Window™ with a minimized traditional price chart. Alternatively, the Master ValueCharts Window™ may be configured with a minimized ValueCharts™ and Price Action Profile™. FIG. 10 displays the Master ValueCharts Window™ with a minimized ValueCharts™. FIG. 11 displays the Master ValueCharts Window™ with a minimized traditional price chart and ValueCharts™. A user may expand, collapse, maximize, and/or minimize the sub-graphs at their discretion in order to quickly and easily access a particular sub-graph. Each sub-graph may include a graph, table, chart, and information supplied by each sub-graph.

Furthermore, the Master ValueCharts Window™ may allow a user to purchase/sell or place an order based upon the valuation of a particular market. For example, a user or investor may place an order when particular events arise, such as "Buy 100 Apple at Moderately Oversold or better" or "Buy 100 Apple at −6 ValueCharts™ Level or better." Users may also access market valuation levels, ValueCharts™, and Price Action Profile™ from any communication device, such as smart phones, tablets, netbooks, laptops, iPads, and any other communication device known to one of ordinary skill in the art.

Figure 12:
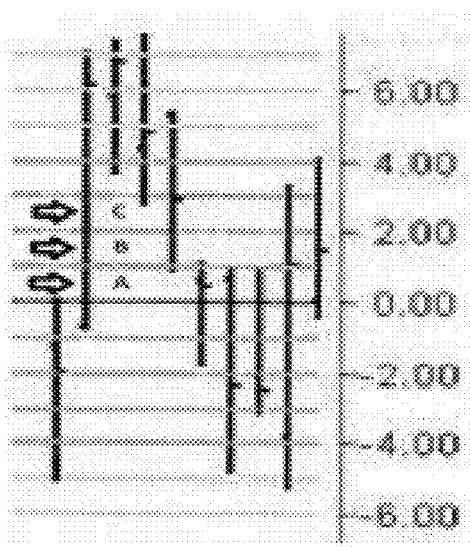
FIG. 12 displays Volume Weighted ValueCharts™ Bars according to an embodiment of the present invention.
Figure 13:
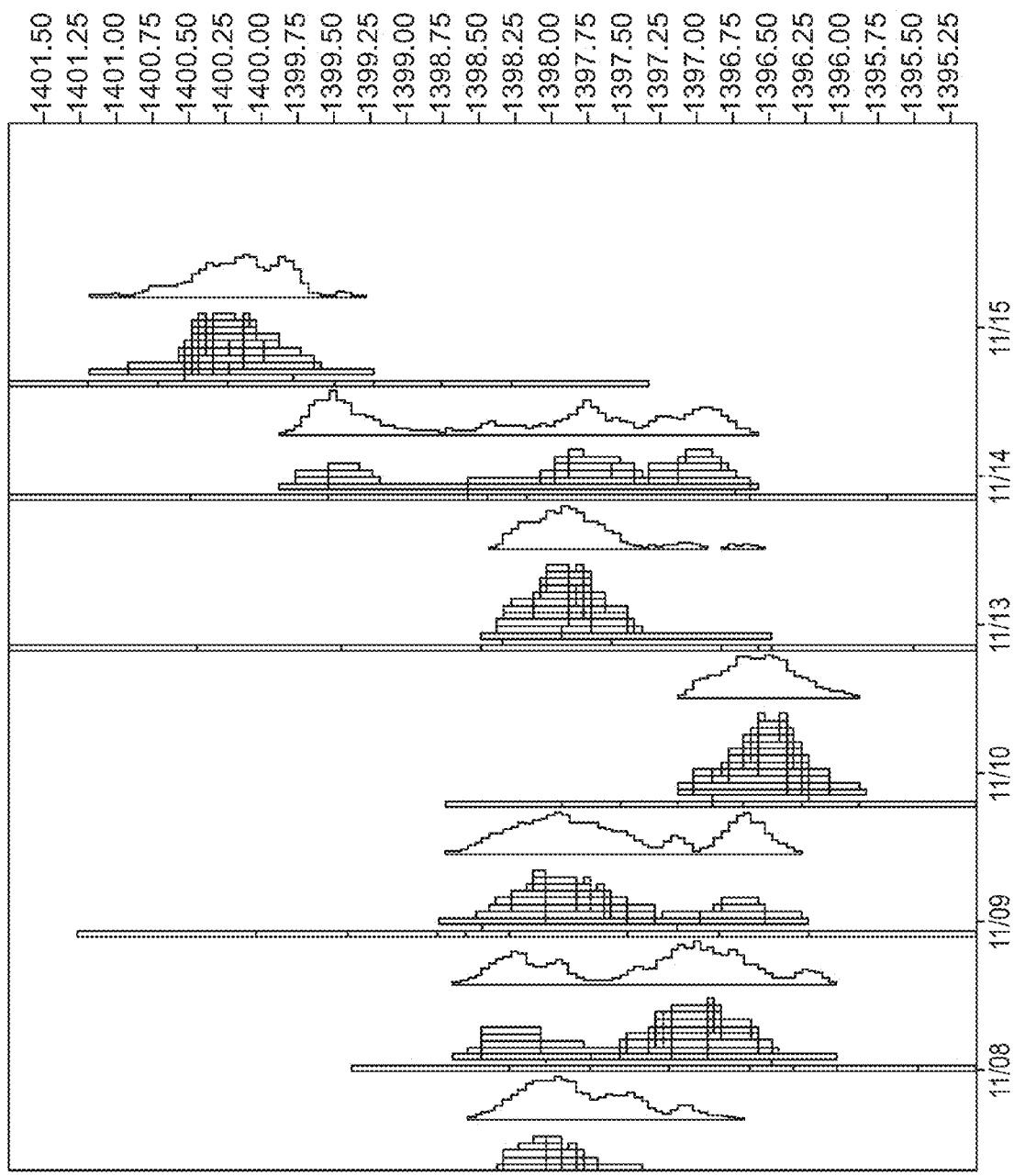
FIG. 13 displays Volume Weighted Price Action Profile™ Bars according to an embodiment of the present invention.

Referring to FIGS. 12-13, FIG. 12 displays Volume Weighted ValueCharts™ and FIG. 13 displays Volume Weighted Price Action Profile™. Volatility adjusted information, such as represented on a ValueCharts™ and Price Action Profile™ may be constructed from non-volume based ValueCharts™ price bars. The frequency histogram of the traditional ValueChart bars contained within each Dynamic Volatility Unit does not take into account a particular volume, at each price tick. Each individual ValueCharts™ price bar that trades across multiple intervals, or Dynamic Volatility Unit™ is handled as if trading activity within the price bar is evenly distributed across the entire price bar for frequency histogram calculation purposes. However, this particular situation rarely occurs. Referring once again to FIG. 13, when the volume is not considered, it is assumed that all three sections of a referenced price bar, each contain the same amount of price activity in each price bar segment. However, volume is rarely distributed uniformly across a price bar.

The Volume Weighted ValueCharts™ and the Volume Weighted Price Action Profile™ may take into consideration the volume of trading activity at each tick price level within a given bar. When calculating trading activity within each Dynamic Volatility Unit ("DVU"), it may be determined that the amount of shares or contracts traded within each DVU as a percentage of the total shares or contracts for an associated bar. The given information may then be compiled by the Volume Weighted Price Action Profile™ frequency histogram. This may result in the Price Action Profile™ frequency histogram to give more weight to sections of a ValueCharts™ price bar where more trading activity, increased volume, has occurred. This may result in a different shaped bell curve Price Action Profile™ when compared to the traditional Price Action Profile™, as shown in FIG. 19.

Figure 14:
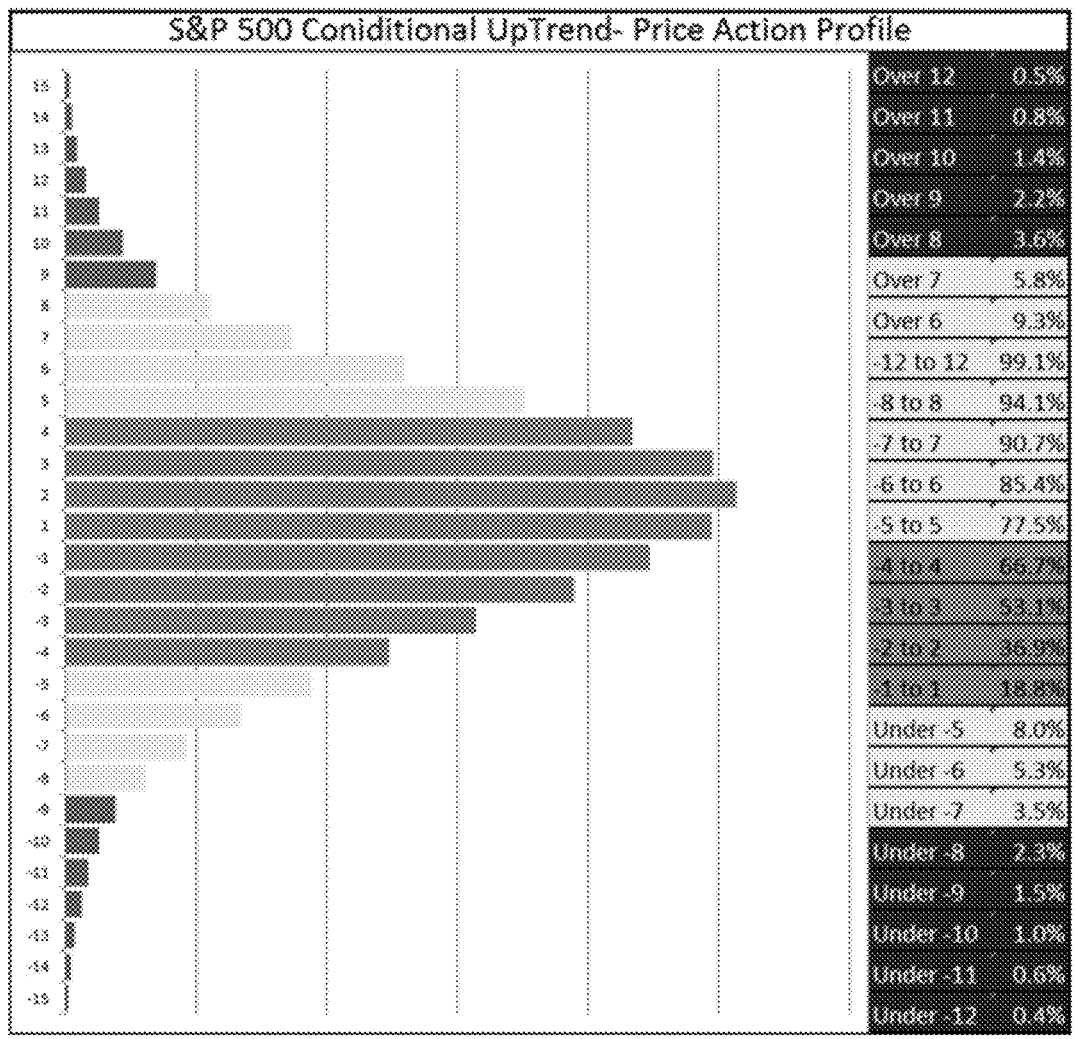
FIG. 14 displays a Conditional Price Action Profile™ as generated from an S&P 500 ValueCharts™.

Referring to FIG. 14, a Conditional Price Action Profile™ is displayed. The Conditional Price Action Profile™ is a Price Action Profile™ that may be generated from ValueCharts™ price bars when one or several defined conditions are satisfied. For example, the Conditional Price Action Profile™ is generated from a daily S&P 500 ValueCharts™ price bars that are only collected or selected when the S&P 500 is trading above the 200-day moving average, which may signify a bull market for example. Additionally, the Conditional Price Action Profile™ may contain a positive or negative skew that may be reflective of a specific market environment that the condition defines, such as the bull market environment in the S&P 500 example. Any desired condition may be reflected in the Conditional Price Action Profile™.

Figure 15:
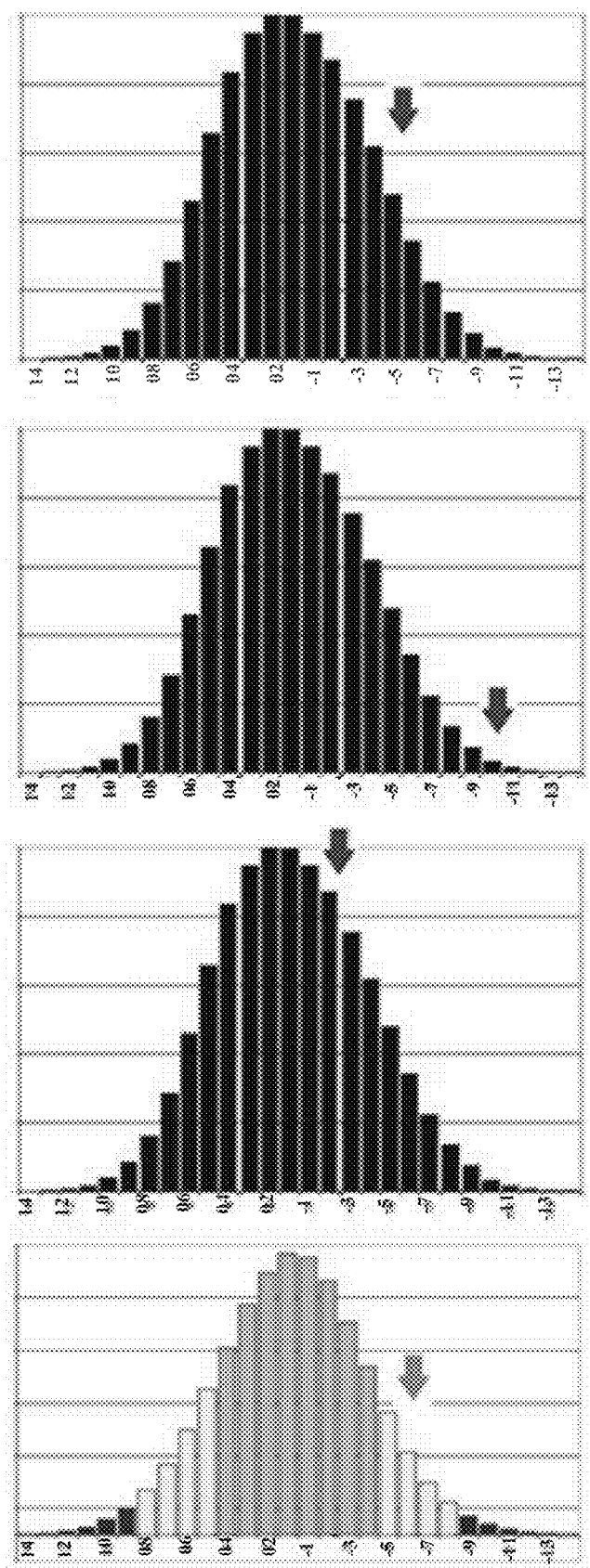
FIG. 15 displays a Price Action Profile™ Pro that is generated from several Price Action Profile™.

Referring to FIG. 15, further ValueCharts™ and Price Action Profile™ methods and indicators may include what may be termed a Pro indicator, such as a Price Action Profile™ Pro as displayed in FIG. 15. The Price Action Profile™ Pro indicator may be a composite Price Action Profile™ that reflects an average of several subordinate Price Action Profile™. The Price Action Profile™ Pro may display a valuation indicator that tracks an average valuation from several subordinate Price Action Profile™. The Price Action Profile™ Pro may also display current valuations from each of the subordinate Price Action Profile™ in one convenient window. The contributing or subordinate Price Action Profile™ may be generated from multiple time frames, such as 30-minute price bars, 60-minute price bars, and daily price bars, within a single or several different markets in a given sector. In FIG. 15, the Price Action Profile™ to the far left represents the Price Action Profile™ Pro, which may be a multi-colored Price Action Profile™ that includes a green arrow that represents the average valuation level from the three subordinate Price Action Profile™. The Price Action Profile™ Pro also displays the average overbought/oversold valuation level from the three contributing Price Action Profile™. Furthermore, FIG. 15 illustrates three Price Action Profile™ that combine to generate the Price Action Profile™. However, any given number of Price Action Profile™ over any different may be combined or contributed to generate a Universal Price Action Profile™.

Figure 16:
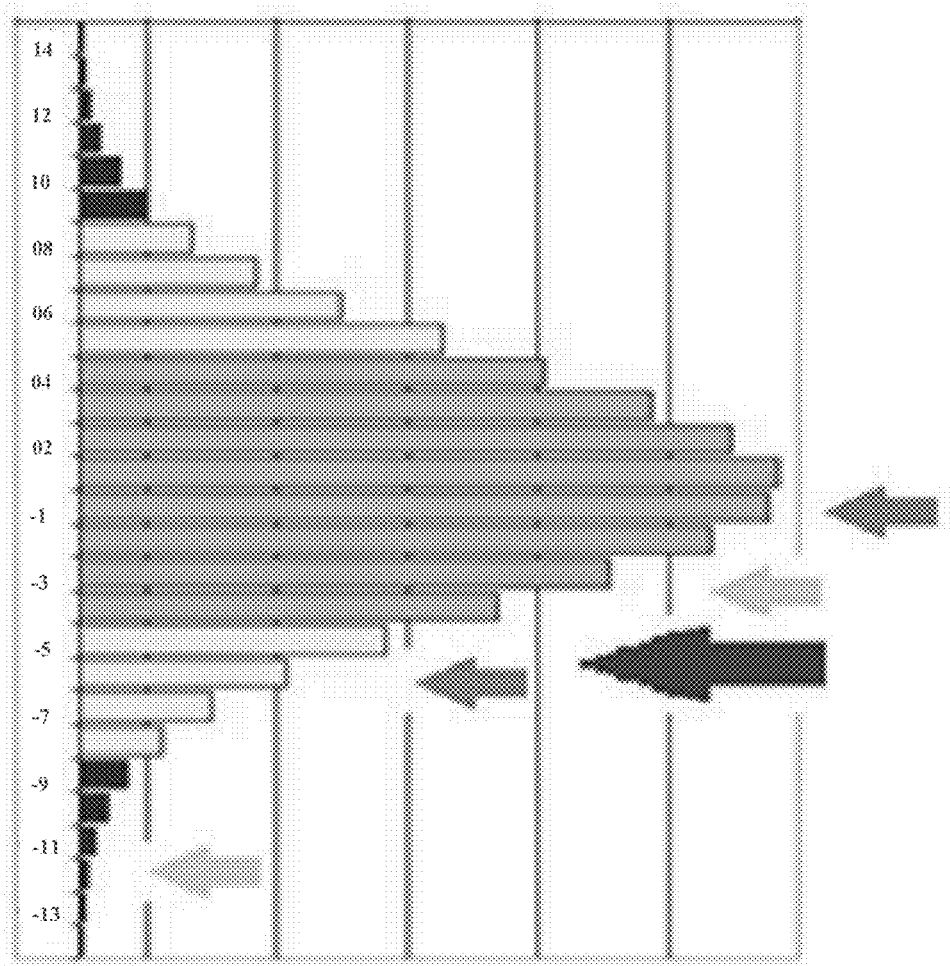
FIG. 16 displays a Price Action Profile™ Pro without contributing Price Action Profile™, but displays their representative valuation level arrows on the Price Action Profile™ Pro.

Referring to FIG. 16, an example communication of the indicator Price Action Profile™ Pro without contributing Price Action Profile™ is displayed, but displays their representative valuation level arrows on the Price Action Profile™ Pro. The largest arrow (which may be colored such as a "red" arrow for example), may represent the Price Action Profile™ Pro average valuation resulting from the contributing one of more Price Action Profile™. The other multi-colored arrows may represent the valuation levels from each respective, contributing Price Action Profile™. Any other suitable indicators may be used.

Further ValueCharts™ and Price Action Profile™ methods and indicators may include combining the valuation of multiple ValueCharts® indicators into a single indicator. In one of many examples of this approach, a ValueCharts® Pro indicator may be created by using inputs as follows:

Inputs
5 Bar Monthly ValueCharts® Price Window
5 Bar Weekly ValueCharts® Price Window
21 Bar Daily ValueCharts® Price Window
14 Bar 60 Minute ValueCharts® Price Window
21 Bar 5 Minute ValueCharts® Price Window
As an example of the output indicator using such inputs, the output may be communicated in a price window similar to that shown in FIG. 23 or other suitable manner.
Output
ValueCharts® Pro Price Window (displaying the aggregate of the inputs set forth above) By combining all of the inputs into a single ValueCharts® Pro Price Window that could equally weight the above or individually weight the above inputs. The ValueCharts® Pro indicators essentially track and combine multiple ValueCharts® indicators into a single Pro indicator, as described with reference to Price Action Profile® above. Also, any suitable communication protocol or indicator may be produced, such as displaying this information graphically, as in FIGS. 18 and 19 above, with text, colors and symbols, etc. The Pro concept where an aggregation or step of combining the valuation of multiple ValueCharts or other indicators of the invention into a single indicator, can also be applied to other indicators according to the invention Thus, with any of the examples of the invention, a single indicator of either the composite of data over different time periods. It is also possible to allow the user the ability to select each input individually in a simple fashion. The user could change the look back period or utilize multiple look back periods within the same and/or different time frames, and other suitable variations are possible and contemplated.

In addition to utilizing ValueCharts™ and Price Action Profile™, a user or investor may place an order by using valuation language. The valuation language may be based upon relative, volatility adjusted valuation levels. For example, the investor may decide to:

Buy 100 shares of Apple Inc. at a −9 (Significantly Undervalued), 5 bar, daily ValueCharts™ price level.
Sell 50 COMEX Gold contracts at a +6 (Moderately Overvalued), 14 bar, daily ValueCharts™ price level.
Buy 12 Dec. Eurocurrency at a −3 (Fair Value), 5 bar, 60-minute ValueCharts™ price level or better.
Buy 100 shares of IBM at +8.5 (Significantly Undervalued) 5 bar, 240-minute ValueCharts™ price level stop.

ValueCharts™ and Price Action Profile™ may also be utilized not only with stock markets and commodities, but also with the automotive or other industries. Examples of possible applications extend to all markets, including but not limited to stocks, ETFS, indices, currencies, bonds, commodities, futures, options, automobiles, non-commercial and commercial real estate and many others. For example, as stock prices and commodities are utilized in the systems and methods described above, automotive vehicles or consumer vehicle prices may also be utilized in the systems and methods described above. A vehicle histogram may represent recent transaction history from a particular make and model used car market. The systems and methods described above may be organized in a manner to generate valuation zones with corresponding colors for the fluctuating prices of the vehicles. Vehicle ValueCharts™ and Price Action Profile™ may provide understandable valuations of used vehicles to potential buyers and sellers. In the same way, other articles of commerce may be valued according to the invention.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A system for facilitating the making of a trading decision relative to an article of commerce, said system comprising:
a programmable computer having a central processing unit (CPU);
a communication device linked to said computer for receiving a collection of price data relating to an investment from a data source;
a software program for providing a set of instructions to said computer to receive and process said collection of price data related to the article of commerce to generate volatility-adjusted relative price data related to the article of commerce and to generate an indication of a valuation state of a market for the article of commerce as being currently priced at a fair value, as overvalued or as undervalued;
the software program providing information for display in the form selected from the group consisting of a known price chart relating to the article of commerce, a volatility adjusted price chart related to the article of commerce, a profile related to the article of commerce showing the historical behavior of the volatility adjusted price information, the current valuation state of the article of commerce and combinations thereof.

2. The system according to claim 1, wherein the information is displayed on a display with a known price chart on the display and a volatility adjusted price chart on the display and positioned adjacent the known price chart.

3. The system according to claim 1, wherein the information is displayed on a display and includes a known price chart on the display, a volatility adjusted price chart on the display and a profile showing the historical behavior of the volatility adjusted price information on the display.

4. The system according to claim 1, wherein the information for display further comprising a percentage indicator of trading activity.

5. The system according to claim 1, wherein the information for display further comprising an indicator indicating the current valuation state of the article of commerce.

6. The system according to claim 1, wherein the indicator indicating the current valuation state is a color, with at least one color for each of the valuation states of fair value, overvalued or as undervalued.

7. The system according to claim 1, wherein a user may place an order relative to the article of commerce when a particular event relating to the current valuation state of the article of commerce arises.

8. A system for facilitating the making of a trading decision relative to an article of commerce, said system comprising:
a programmable computer having a central processing unit (CPU);
a communication device linked to said computer for receiving a collection of price data relating to an investment from a data source;
a software program for providing a set of instructions to said computer to receive and process said collection of price data related to the article of commerce to generate volatility-adjusted relative price data related to the article of commerce and to generate an indication of a state of a market for the article of commerce as being currently priced at a fair value, as overvalued or as undervalued;
the software program providing information relating to the volatility adjusted price information relating to the article of commerce, enabling a user to specify buying or selling the article of commerce using the designated valuation of fair value, moderately overvalued or undervalued, or significantly overvalued or undervalued or combinations thereof.

9. The system according to claim 8, wherein the user can specify buying or selling the article of commerce via communication device.

10. The system according to claim 8, wherein the user can specify buying or selling the article of commerce which occurs automatically upon the designated valuation occurring.

11. A system for facilitating the making of a trading decision relative to an article of commerce, said system comprising:
a programmable computer having a central processing unit (CPU);
a communication device linked to said computer for receiving a collection of price data relating to an investment from a data source;
a software program for providing a set of instructions to said computer to receive and process said collection of price data related to the article of commerce to generate volatility-adjusted relative price data related to the article of commerce and to generate an indication of a state of a market for the article of commerce as being currently priced at a fair value, as overvalued or as undervalued;
the software program providing information for communicating volatility adjusted price information related to the article of commerce and indicating the occurrence of a defined condition or event.

12. The system according to claim 11, wherein the user can specify buying or selling the article of commerce via communication device upon the occurrence of the defined condition or event.

13. The system according to claim 11, wherein the user can specify buying or selling the article of commerce which occurs automatically upon the occurrence of the defined condition or event;
the software program providing information for communicating volatility adjusted price information related to the article of commerce and indicating the volume of trading activity for the article of commerce at each price level within a predetermined range of volatility adjusted price information.

14. A system for facilitating the making of a trading decision relative to an article of commerce, said system comprising:
a programmable computer having a central processing unit (CPU);
a communication device linked to said computer for receiving a collection of price data relating to an investment from a data source;
a software program for providing a set of instructions to said computer to receive and process said collection of price data related to the article of commerce to generate volatility-adjusted relative price data related to the article of commerce and to generate an indication of a state of a market for the article of commerce as being currently priced at a fair value, as overvalued or as undervalued;
the software program providing information for communicating volatility adjusted price information related to the article of commerce and indicating the volume of trading activity for the article of commerce at each price level within a predetermined range of volatility adjusted price information.

15. The system according to claim 14, wherein the information for communicating volatility adjusted price information related to the article of commerce is via price bars and the volume of trading activity takes into consideration the volume of trading activity at each tick price level within a given price bar.

16. The system according to claim 14, further comprising an indication of a profile related to the article of commerce showing the historical behavior of the volatility adjusted price information, with the profile including information on volume of trading activity for the article of commerce.

17. A system for facilitating the making of a trading decision relative to an article of commerce, said system comprising:
a programmable computer having a central processing unit (CPU);
a communication device linked to said computer for receiving a collection of price data relating to an investment from a data source;
a software program for providing a set of instructions to said computer to receive and process said collection of price data related to the article of commerce to generate volatility-adjusted relative price data related to the article of commerce and to generate an indication of a state of a market for the article of commerce as being currently priced at a fair value, as overvalued or as undervalued;

the software program providing information for indicating a profile related to the article of commerce showing the historical behavior of the volatility adjusted price information related to the article of commerce and created using composite information relating to a plurality of contributing profiles.

18. The system according to claim 17, wherein the information for indicating a profile includes an average of several subordinate profiles.

19. The system according to claim 18, wherein the subordinate profiles are generated from data selected from multiple time frames, a single or several different markets or combinations thereof.

20. The system according to claim 18, further comprising an indicator showing the average valuation level from the subordinate profiles.

* * * * *

UNITED STATES PATENT AND TRADEMARK OFFICE
CERTIFICATE OF CORRECTION

PATENT NO. : 8,612,334 B2
APPLICATION NO. : 13/485376
DATED : December 17, 2013
INVENTOR(S) : Mark W. Helweg It is certified that error appears in the above-identified patent and that said Letters Patent is hereby corrected as shown below:

In the Specification

In column 4, line 59,
delete "for determining Dynamic Volatility Units(DVU)"
insert -- for determining Dynamic Volatility Units (DVU) --

In column 4, line 67,
delete "Value Price = (Price – Floating Axis) + DVU"
insert -- Value Price = (Price – Floating Axis) ÷ DVU --

In column 11, line 5,
delete " i.e. $\lim_{N \to \infty} \left[ 1 - \left(1 - \frac{2}{N+1}\right)^{N+1} \right] \lim_{N \to \infty} \left[ 1 - \left(1 - \frac{2}{N+1}\right)^{N+1} \right]$ Simplified, tends to $1-e^{-2} \approx 0.8647$. "

insert -- i.e. $\lim_{N \to \infty} \left[ 1 - \left(1 - \frac{2}{N+1}\right)^{N+1} \right]$ Simplified, tends to $1-e^{-2} \approx 0.8647$. --

In column 12, lines 38-42,
delete "
$$L_n = \left(1 - \exp\left(-\frac{5}{15 \times 60}\right)\right) \times Q_n + e^{15^5 \times 60} \times L_{n-1} = \left(1 - \exp\left(-\frac{1}{180}\right)\right) \times Q_n + e^{1/180} \times L_{n-1}$$
$$= Q_n + e^{1/180} \times (L_{n-1} - Q_n)$$
"

insert --
$$L_n = \left(1 - \exp\left(-\frac{5}{15 \times 60}\right)\right) \times Q_n + e^{-\frac{5}{15 \times 60}} \times L_{n-1} = \left(1 - \exp\left(-\frac{1}{180}\right)\right) \times Q_n + e^{-1/180} \times L_{n-1}$$
$$= Q_n + e^{-1/180} \times (L_{n-1} - Q_n)$$
--

Signed and Sealed this
Second Day of September, 2014

Michelle K. Lee
*Deputy Director of the United States Patent and Trademark Office*